(12) United States Patent
Sakoda

(10) Patent No.: US 8,761,072 B2
(45) Date of Patent: Jun. 24, 2014

(54) COMMUNICATION METHOD, COMMUNICATION DEVICE, AND COMPUTER PROGRAM

(71) Applicant: Sony Corporation, Tokyo (JP)

(72) Inventor: Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/048,737

(22) Filed: Oct. 8, 2013

(65) Prior Publication Data

US 2014/0112314 A1   Apr. 24, 2014

Related U.S. Application Data

(63) Continuation of application No. 13/342,643, filed on Jan. 3, 2012, which is a continuation of application No. 12/901,898, filed on Oct. 11, 2010, now Pat. No. 8,099,049, which is a continuation of application No. 11/733,226, filed on Apr. 10, 2007, now Pat. No. 7,844,223, which is a continuation of application No. 10/544,107, filed as application No. PCT/JP2004/001027 on Feb. 3, 2004, now Pat. No. 7,302,227.

(30) Foreign Application Priority Data

Feb. 3, 2003   (JP) .................................. 2003-026462

(51) Int. Cl.
*H04W 72/00* (2009.01)

(52) U.S. Cl.
USPC ........... 370/312; 370/329; 370/340; 370/478; 370/341

(58) Field of Classification Search
None
See application file for complete search history.

(56) References Cited

U.S. PATENT DOCUMENTS

| | | | |
|---|---|---|---|
| 5,940,399 A * | 8/1999 | Weizman | 370/445 |
| 6,282,407 B1 * | 8/2001 | Vega et al. | 455/41.1 |
| 6,466,634 B1 * | 10/2002 | O'Toole et al. | 375/374 |
| 6,751,455 B1 * | 6/2004 | Acampora | 455/414.1 |
| 6,791,996 B1 * | 9/2004 | Watanabe et al. | 370/447 |
| 6,798,761 B2 * | 9/2004 | Cain et al. | 370/337 |
| 6,907,258 B2 * | 6/2005 | Tsutsumi et al. | 455/512 |
| 6,980,810 B1 * | 12/2005 | Gerakoulis et al. | 455/450 |

(Continued)

FOREIGN PATENT DOCUMENTS

| | | |
|---|---|---|
| EP | 1 061 694 A2 | 12/2000 |
| JP | 2000-165930 | 6/2000 |

(Continued)

OTHER PUBLICATIONS

Woesner et al., Jun. 1998, IEEE, "Power-Saving Mechanism in Emerging Standards for Wireless LANs: The MAC Level Perspective", p. 40-47.*

(Continued)

*Primary Examiner* — Ian N Moore
*Assistant Examiner* — Lakeram Jangbahadur
(74) *Attorney, Agent, or Firm* — Oblon, Spivak, McClelland, Maier & Neustadt, L.L.P.

(57) ABSTRACT

An electronic device includes processing circuitry configured to set a transmitting and receiving operation as active state for a first operating period and determine whether to set the transmitting and receiving operation as a state in which transmission or reception is limited after the first operating period elapses.

21 Claims, 27 Drawing Sheets

(56) References Cited

U.S. PATENT DOCUMENTS

| | | |
|---|---|---|
| 7,092,353 B2 * | 8/2006 | Laroia et al. ............... 370/210 |
| 7,302,227 B2 | 11/2007 | Sakoda |
| 7,366,200 B2 * | 4/2008 | Laroia et al. ............... 370/478 |
| 7,564,812 B1 * | 7/2009 | Elliott ............... 370/329 |
| 7,844,223 B2 | 11/2010 | Sakoda |
| 8,099,049 B2 | 1/2012 | Sakoda |
| 2003/0053437 A1 * | 3/2003 | Bahl et al. ............... 370/345 |
| 2003/0174690 A1 * | 9/2003 | Benveniste ............... 370/350 |
| 2003/0210658 A1 * | 11/2003 | Hernandez et al. ............... 370/311 |
| 2004/0008661 A1 * | 1/2004 | Myles et al. ............... 370/350 |
| 2004/0013127 A1 * | 1/2004 | Shvodian ............... 370/442 |
| 2004/0023641 A1 * | 2/2004 | Tsutsumi et al. ............... 455/411 |
| 2004/0043780 A1 * | 3/2004 | Sugaya et al. ............... 455/500 |
| 2004/0047314 A1 * | 3/2004 | Li ............... 370/335 |
| 2004/0152416 A1 * | 8/2004 | Dahl ............... 455/41.2 |
| 2004/0152464 A1 * | 8/2004 | Sugaya ............... 455/435.1 |
| 2004/0153676 A1 * | 8/2004 | Krantz et al. ............... 713/300 |
| 2012/0170562 A1 | 7/2012 | Sakoda |

FOREIGN PATENT DOCUMENTS

| | | |
|---|---|---|
| JP | 2000-358059 | 12/2000 |
| JP | 2002-300175 | 10/2002 |
| JP | 2003-229869 | 8/2003 |
| WO | WO 98/09461 | 3/1998 |

OTHER PUBLICATIONS

U.S. Appl. No. 14/049,949, filed Oct. 9, 2013, Sakoda.
U.S. Appl. No. 14/051,177, filed Oct. 10, 2013, Sakoda.

* cited by examiner

FIG. 12

List of STA-0

| Neighbor ID | For Tx. | For Rx. |
|---|---|---|
| STA-1 | ACT-0 (A) | ACT-0 (A) |
| STA-2 | ACT-0 (B) | ACT-0 (B) |
| STA-3 | ACT-0 (C) | ACT-0 (C) |
| :(0) | :(1) | :(2) |

List of STA-1

| Neighbor ID | For Tx. | For Rx. |
|---|---|---|
| STA-0 | ACT-0 (A) | ACT-0 (A) |
| STA-2 | ACT-0 (B) | ACT-0 (B) |
| STA-3 | ACT-0 (C) | ACT-0 (C) |
| :(0) | :(1) | :(2) |

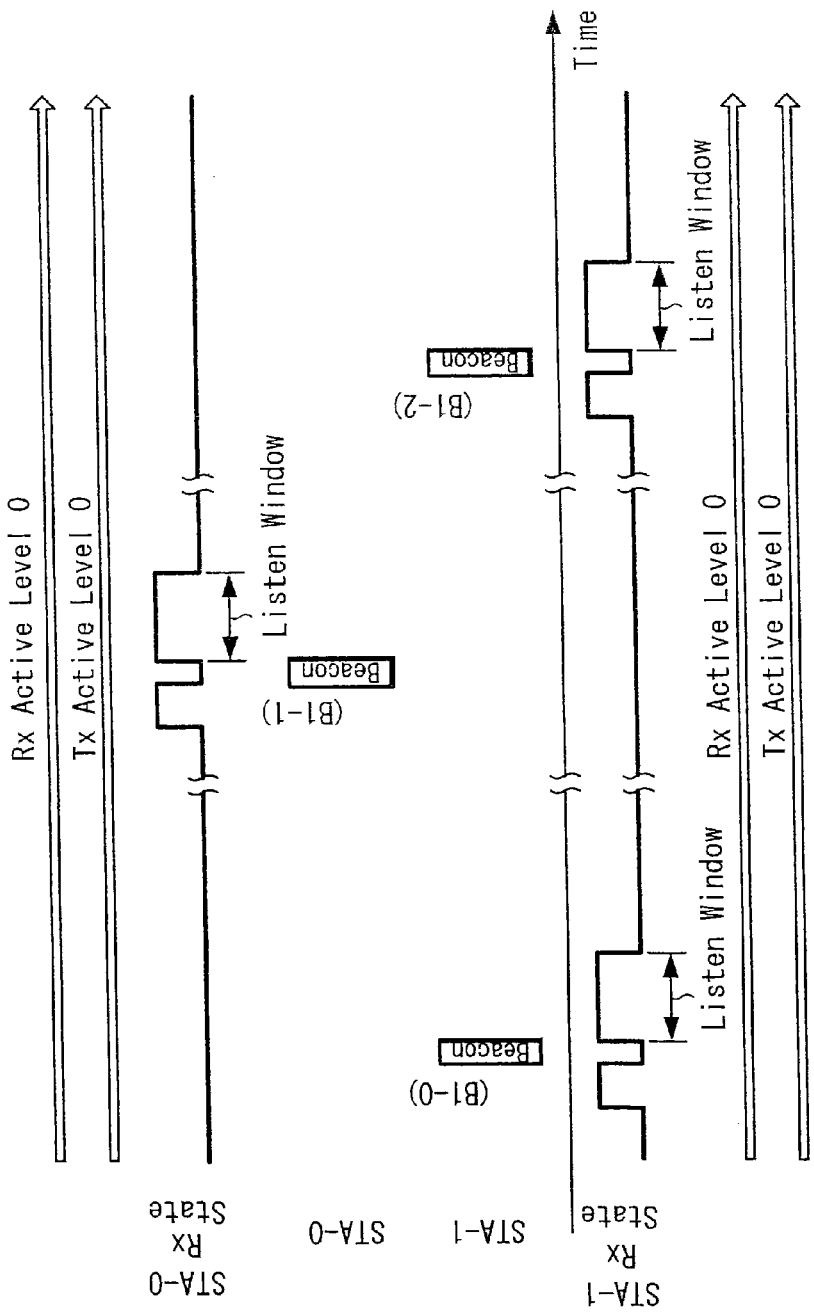

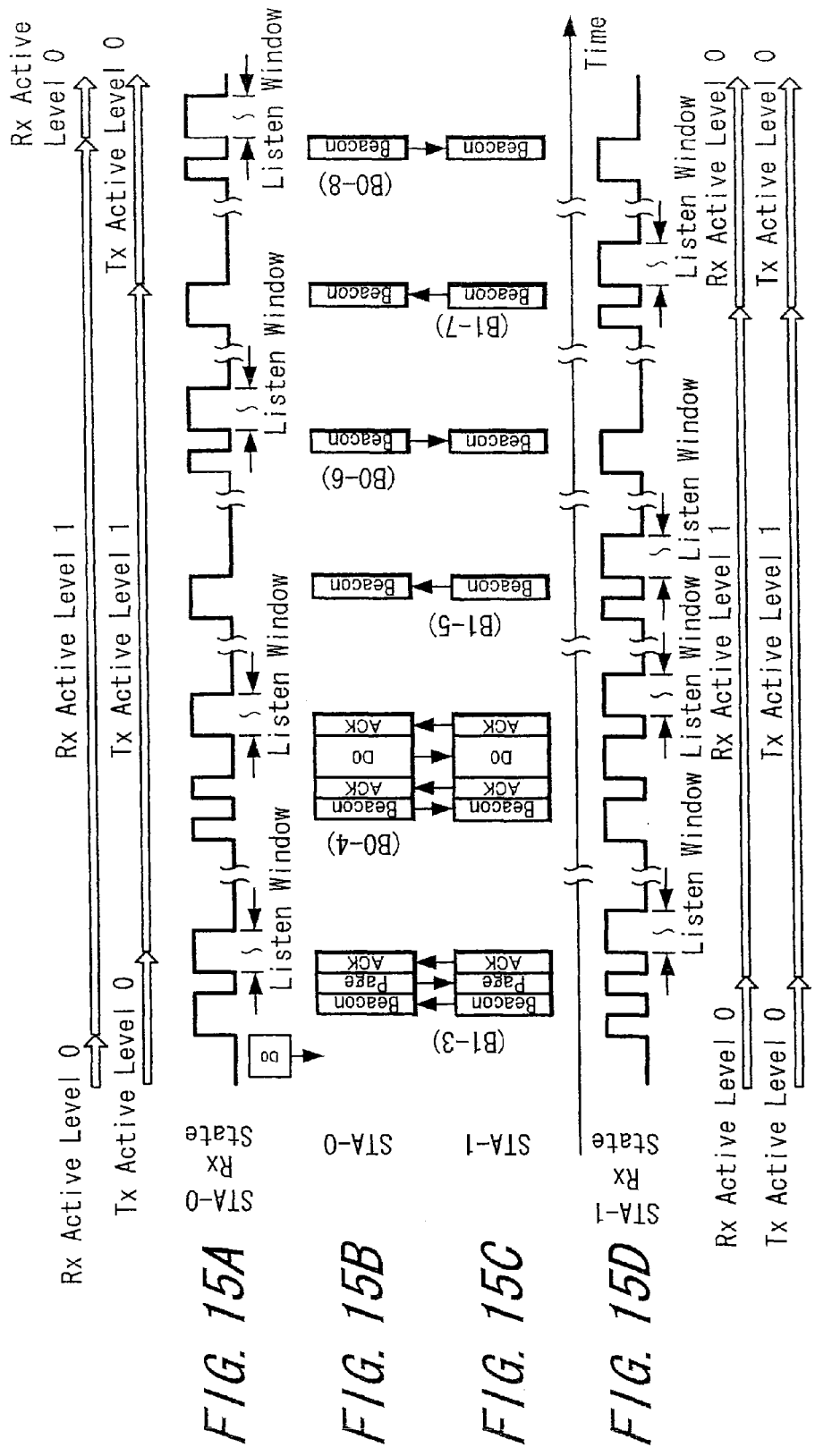

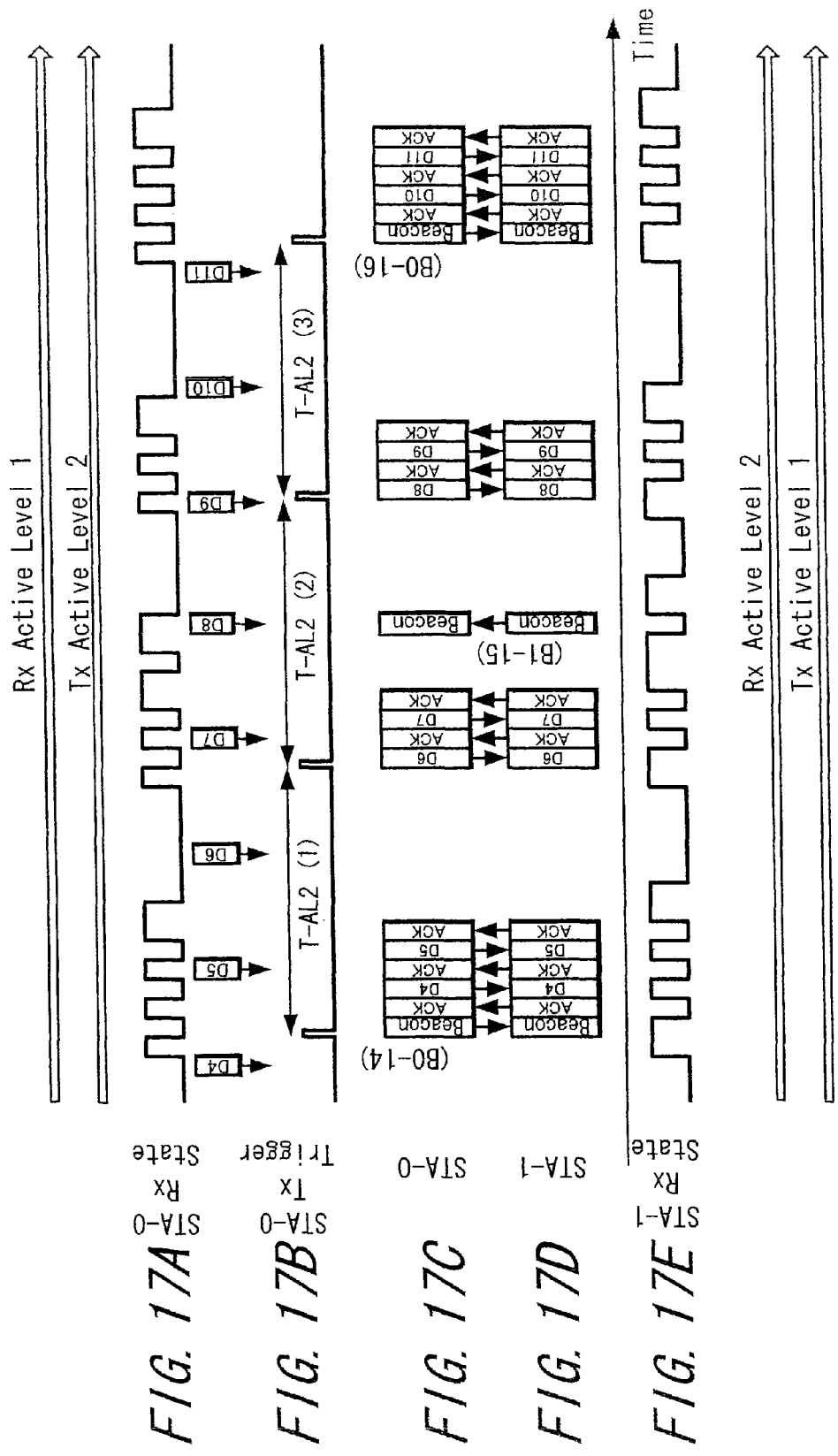

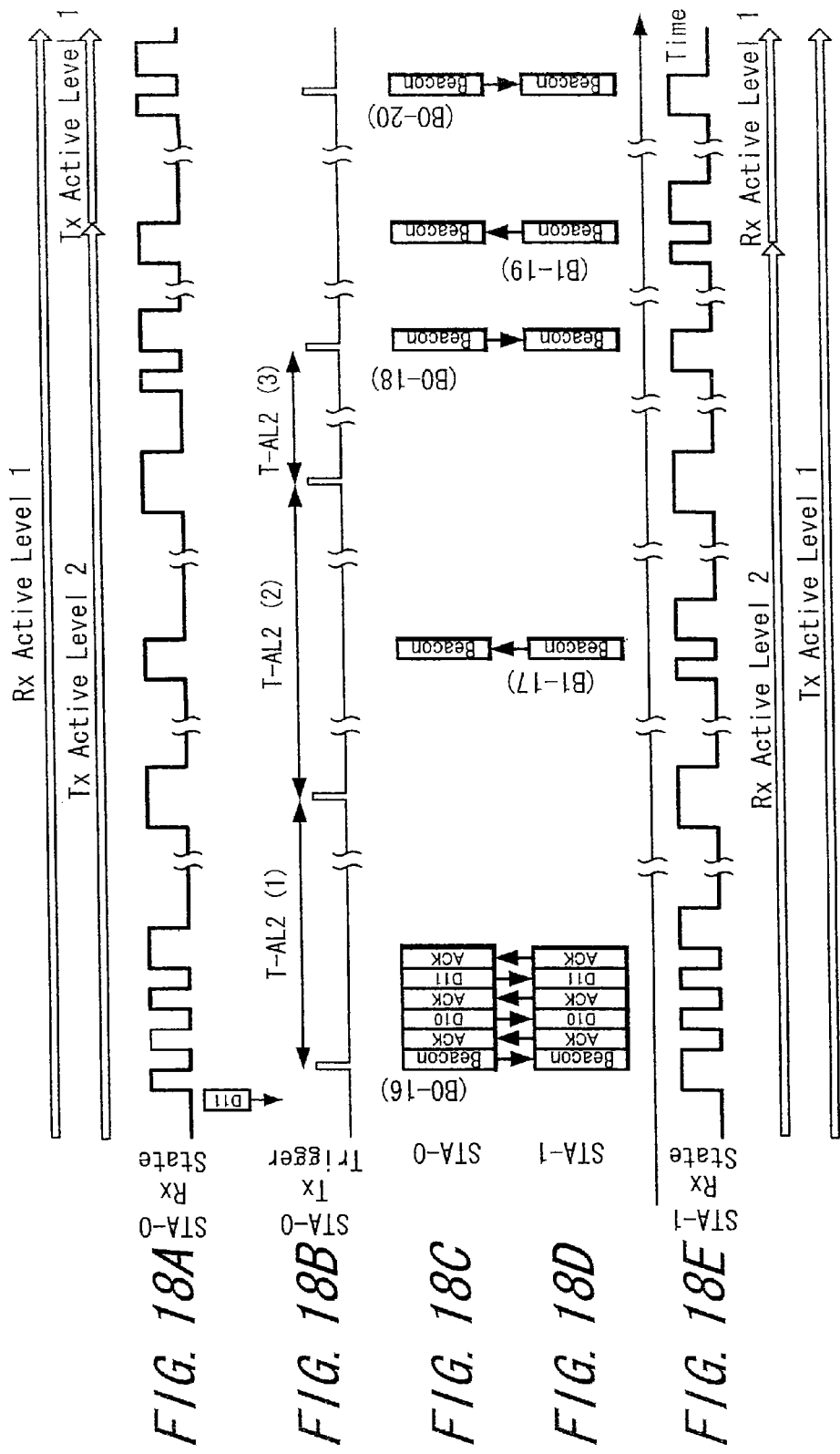

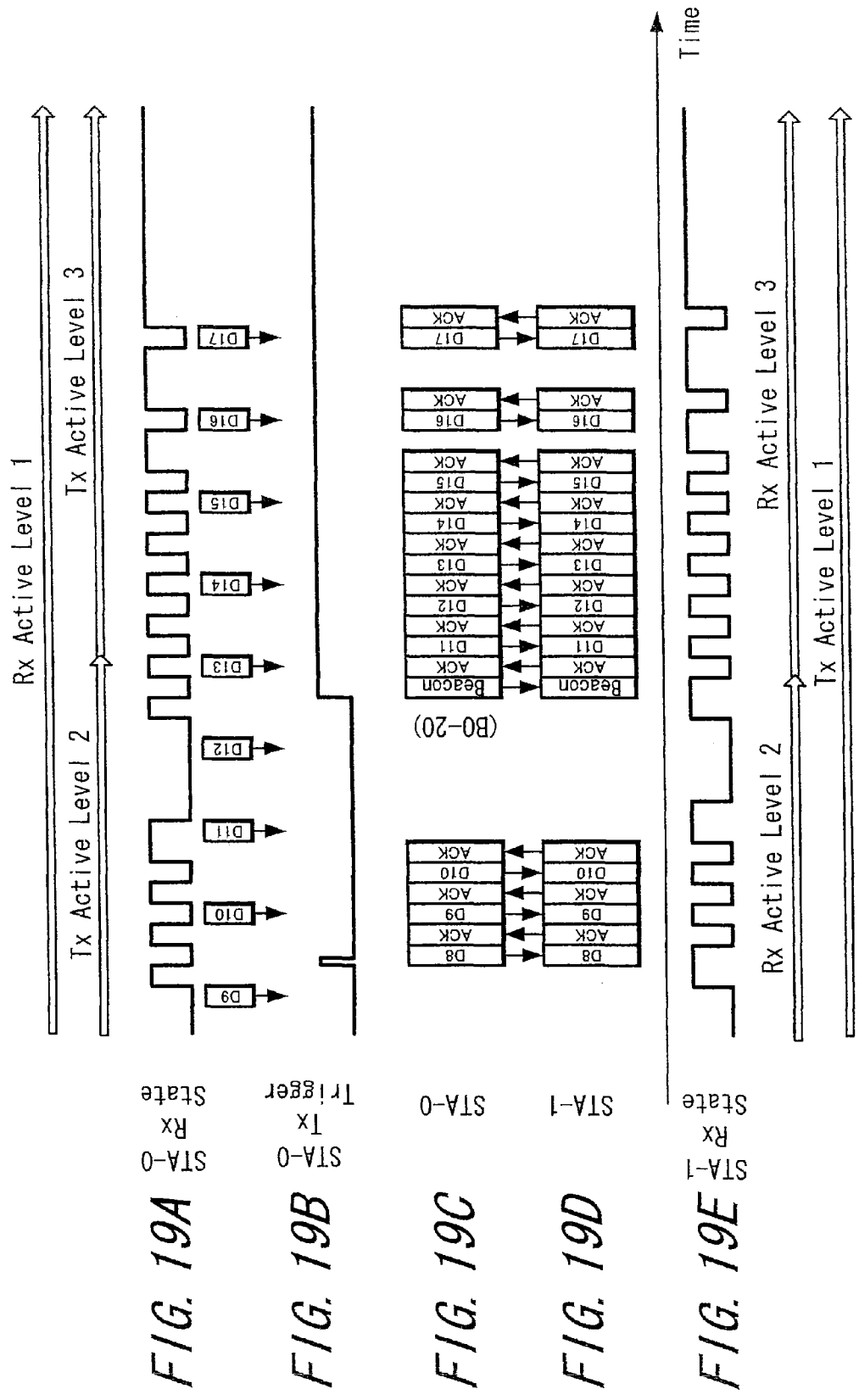

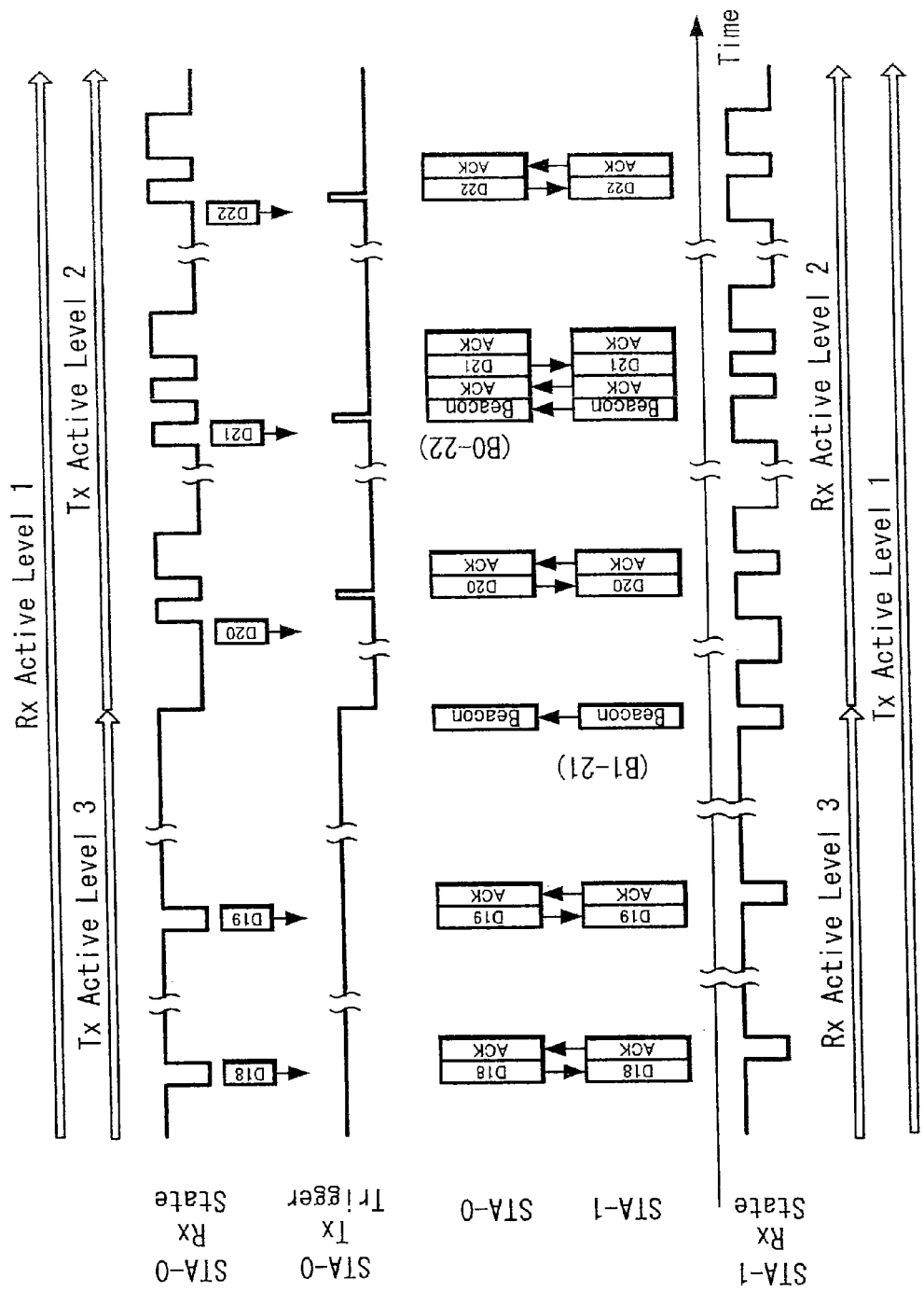

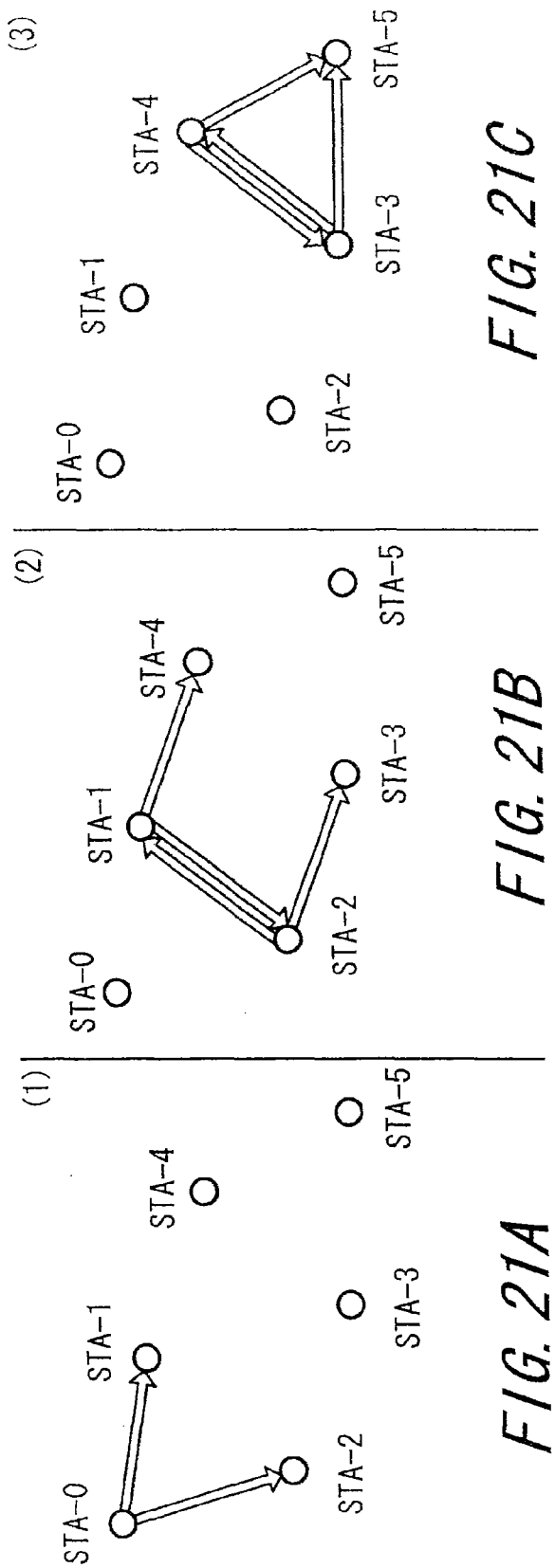

FIG. 23

List of STA-0

@T0

Status: ACT-0

| NeighborID | For Tx. | For Rx. |
|---|---|---|
| STA-1 | ACT-0 | ACT-0 |
| STA-2 | ACT-0 | ACT-0 |

@T1

Status: ACT-1all

| NeighborID | For Tx. | For Rx. |
|---|---|---|
| STA-1 | ACT-0 | ACT-1 |
| STA-2 | ACT-0 | ACT-1 |

@T3

Status: ACT-1all

| NeighborID | For Tx. | For Rx. |
|---|---|---|
| STA-1 | ACT-1 | ACT-1 |
| STA-2 | ACT-0 | ACT-1 |

@T6

Status: ACT-1all

| NeighborID | For Tx. | For Rx. |
|---|---|---|
| STA-1 | ACT-1 | ACT-1 |
| STA-2 | ACT-1 | ACT-1 |

@T7

Status: ACT-1all

| NeighborID | For Tx. | For Rx. |
|---|---|---|
| STA-1 | ACT-1 | ACT-1 |
| STA-2 | ACT-1 | ACT-1 |

List of STA-1

Status: ACT-0

| NeighborID | For Tx. | For Rx. |
|---|---|---|
| STA-0 | ACT-0 | ACT-0 |
| STA-2 | ACT-0 | ACT-0 |

Status: ACT-0

| NeighborID | For Tx. | For Rx. |
|---|---|---|
| STA-0 | ACT-0 | ACT-0 |
| STA-2 | ACT-0 | ACT-0 |

Status: ACT-1all

| NeighborID | For Tx. | For Rx. |
|---|---|---|
| STA-0 | ACT-1 | ACT-1 |
| STA-2 | ACT-1 | ACT-1 |

Status: ACT-1all

| NeighborID | For Tx. | For Rx. |
|---|---|---|
| STA-0 | ACT-1 | ACT-1 |
| STA-2 | ACT-1 | ACT-1 |

Status: ACT-1all

| NeighborID | For Tx. | For Rx. |
|---|---|---|
| STA-0 | ACT-1 | ACT-1 |
| STA-2 | ACT-1 | ACT-1 |

List of STA-2

Status: ACT-0

| NeighborID | For Tx. | For Rx. |
|---|---|---|
| STA-0 | ACT-0 | ACT-0 |
| STA-1 | ACT-0 | ACT-0 |

Status: ACT-0

| NeighborID | For Tx. | For Rx. |
|---|---|---|
| STA-0 | ACT-0 | ACT-0 |
| STA-1 | ACT-0 | ACT-0 |

Status: ACT-0

| NeighborID | For Tx. | For Rx. |
|---|---|---|
| STA-0 | ACT-0 | ACT-0 |
| STA-1 | ACT-0 | ACT-0 |

Status: ACT-1all

| NeighborID | For Tx. | For Rx. |
|---|---|---|
| STA-0 | ACT-1 | ACT-1 |
| STA-1 | ACT-0 | ACT-1 |

Status: ACT-1all

| NeighborID | For Tx. | For Rx. |
|---|---|---|
| STA-0 | ACT-1 | ACT-1 |
| STA-1 | ACT-1 | ACT-1 |

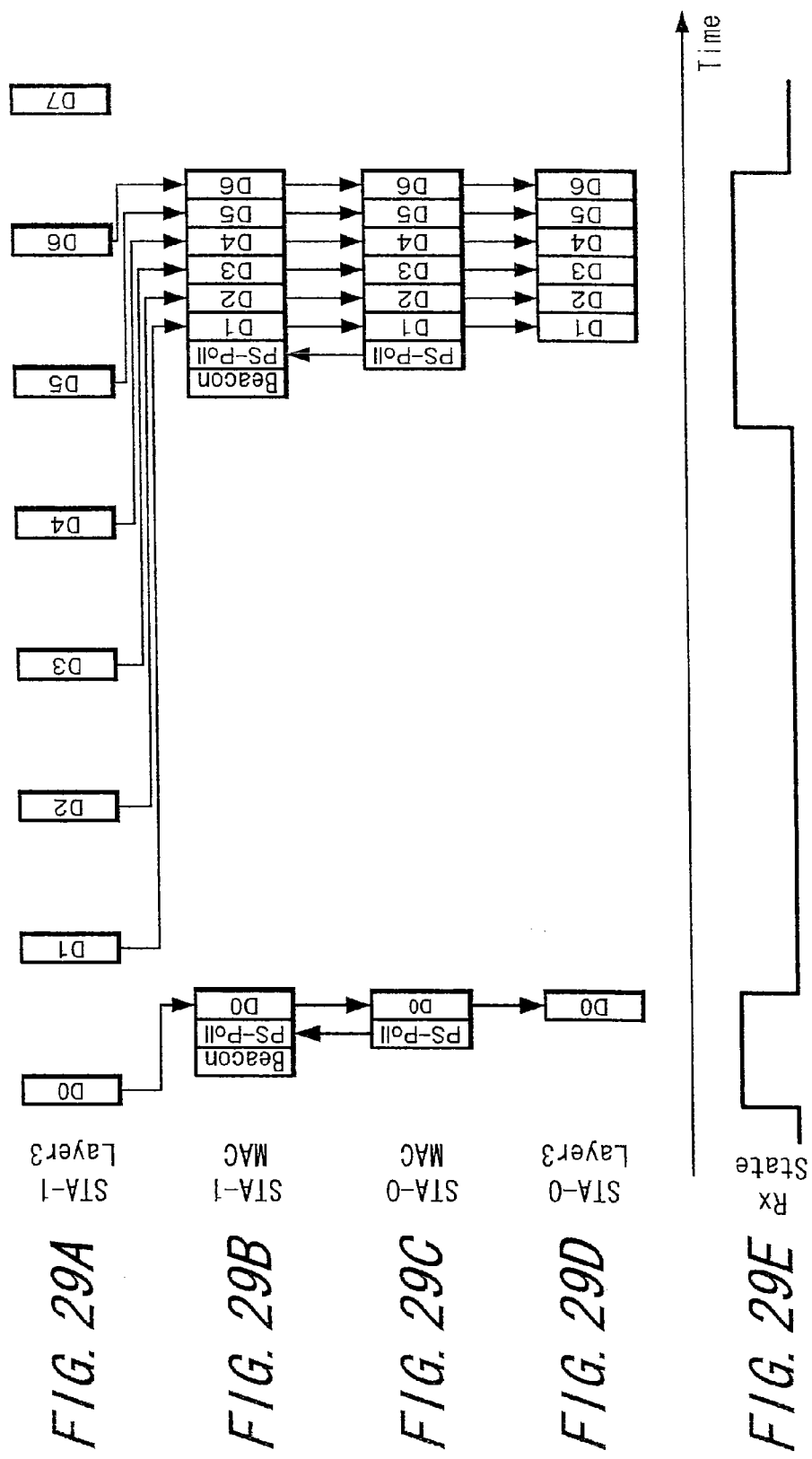

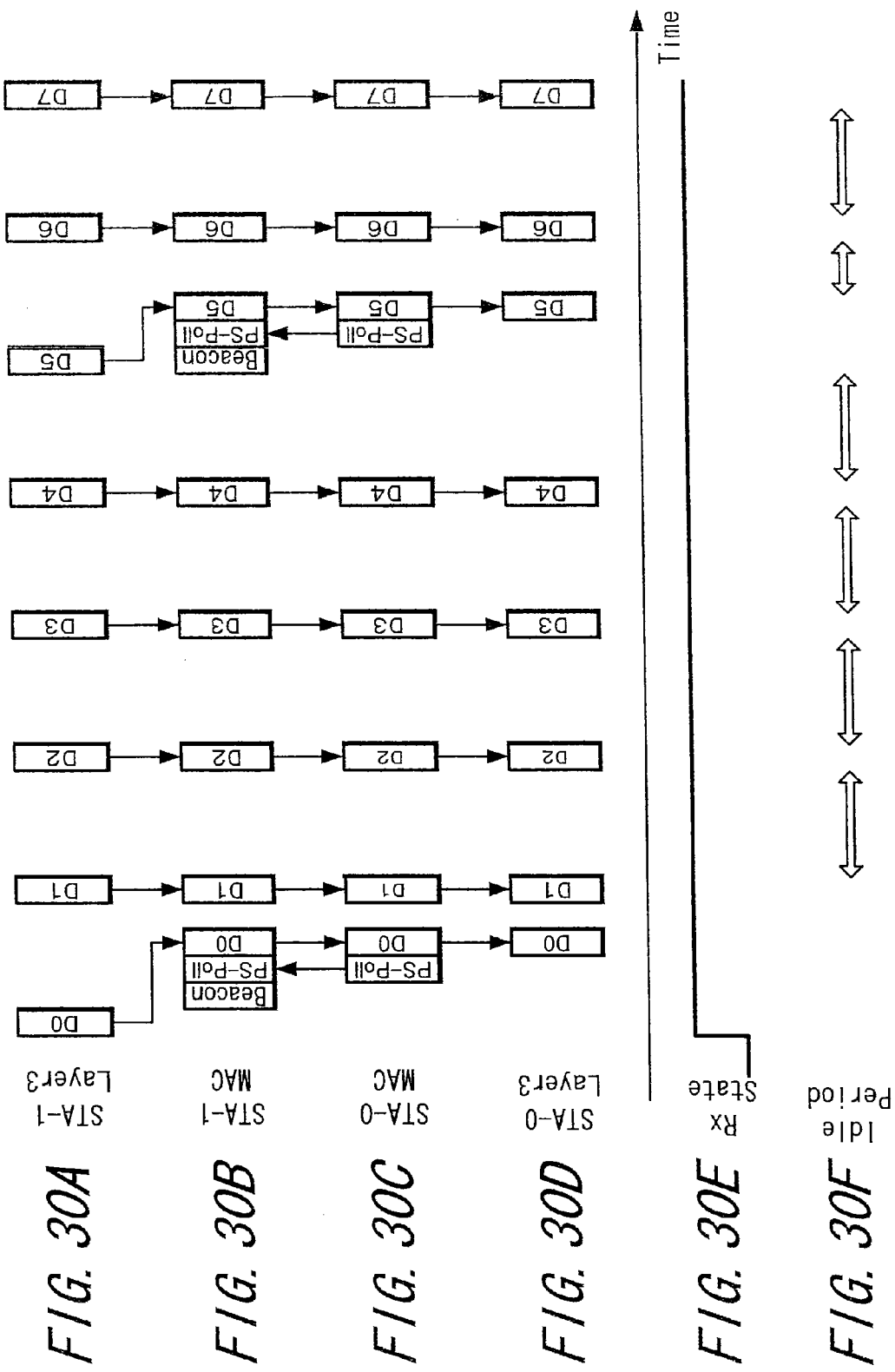

COMMUNICATION METHOD, COMMUNICATION DEVICE, AND COMPUTER PROGRAM

CROSS REFERENCE TO RELATED APPLICATIONS

This application is a continuation of U.S. application Ser. No. 13/342,643, filed Jan. 3, 2012, which is a continuation of U.S. application Ser. No. 12/901,898, filed Oct. 11, 2010, now U.S. Pat. No. 8,099,049, which is a continuation of U.S. application Ser. No. 11/733,226, filed Apr. 10, 2007, now U.S. Pat. No. 7,844,223, which is a continuation of and is based upon and, under 35 U.S.C. §120, claims the benefit of priority of U.S. application Ser. No. 10/544,107, filed May 24, 2006, now U.S. Pat. No. 7,302,227, which is a National Stage of PCT/JP04/01027, filed on Feb. 3, 2004, all of which claim priority to Japanese Patent Application No. 2003-026462, filed on Feb. 3, 2003. The contents of each of all of the above-identified documents are incorporated herein by reference.

TECHNICAL FIELD

The present invention relates to a communication method and a communication apparatus suitable for applying to a wireless LAN (Local Area Network: local information and communication network) system which performs data communication and the like, for example. Particularly, the present invention relates to a communication method and a communication apparatus suitable for applying to a case where an autonomous distributed type network not having a controlling and controlled relation between a master station and a slave station is operated without a configuration control station.

In more detail, the present invention relates to a wireless communication method and a wireless communication apparatus, as well as a computer program, in which an autonomous distributed type wireless network is formed in such a manner that each communication station informs mutually of a beacon having network information and the like written therein at a predetermined frame cycle, and particularly relates to a wireless communication method and a wireless communication apparatus, as well as a computer program in which an autonomous distributed type wireless network is formed while each communication station avoids collision of beacons that are mutually transmitted.

BACKGROUND ART

In the past, an access control defined conforming to the IEEE (The Institute of Electrical and Electronic Engineers) 802.11 method, and the like, are widely known as medium access control of a wireless LAN system. Details of the IEEE 802.11 method is described in the International Standard ISO/IEC 8802-11:1999(E) ANSI/IEEE Std 802.11, 1999 Edition, Part 11: Wireless LAN Medium Access Control (MAC) and Physical Layer (PHY) Specifications, and the like. Networking in the IEEE 802.11 method is based on a concept of BSS (Basic Service Set). There are two kinds of BSS, a BSS defined by an infrastructure mode in which there exists a master control station such as an access point: AP, and an IBSS (Independent BSS) defined by an ad hoc mode which includes only a plurality of terminal stations: MT (Mobile Terminals).

An operation in the IEEE 802.11 at the time of the infrastructure mode is explained using FIG. 27. In the BSS of the infrastructure mode, there exists an access point performing coordination in a wireless communication system, and communication is performed between the access point and a terminal station MT existing around this access point. The access point transmits a control signal called a beacon at an appropriate time interval, and a terminal station MT capable of receiving this beacon recognizes that the access point exists in the neighborhood and further establishes a connection with this access point. FIGS. 27A to 27C describes a case where a communication station STA1 shown in FIG. 27A is an access point and a communication station STA0 shown in FIG. 27B is a terminal station MT. The communication station STA1 transmits a beacon at a fixed time interval as shown in FIGS. 27A to 27C.

The transmission time of the next beacon is informed in the beacon by a parameter called target beacon transmission time (TBTT), and the access point makes a beacon transmission procedure operated when the time becomes the TBTT. In addition, since the neighboring terminal station MT is able to recognize the next beacon transmission time by receiving the beacon and decoding an internal TBTT field thereof, there is also a case where power supply to a reception unit is turned off until a TBTT of the next time or of multiple times ahead and the station MT enters into a sleep state during a period of time considered to be not necessary to communicate with the access point (so-called intermittent reception operation). When information addressed to a specific communication station is contained in a beacon, a field conveying to the effect thereof to the concerned communication station is defined in the beacon, and the terminal station MT having received the beacon can know whether at present the access point retains information addressed thereto.

In FIGS. 27A to 27C, a case where the communication station STA0 receives a beacon of the communication station STA1 once every two times is shown as an example. FIG. 27C shows a state of a reception unit in the communication station STA0, in which a high level shows a state during reception operation and a low level shows a state during suspension of reception. The communication station STA0 operates the reception unit at a timing when the communication station STA1 transmits a beacon B1-0. However, when the reception of the beacon is completed, the communication station STA0 stops the operation of the reception unit, because there is no description in the beacon B1-0 that information addressed thereto is included. The communication station STA0 does not operate the reception unit when a next beacon B1-1 is transmitted, and operates the reception unit aiming at the time when the next beacon B1-2 after the beacon B1-1 is transmitted. In FIGS. 27A to 27C, a case where it is informed in this beacon B1-2 that information addressed to the communication station STA0 is included is referred to as an example.

The communication station STA0, which has recognized by receiving the beacon B1-2 that the information addressed thereto is included, transmits a PS-Poll packet in accordance with a predetermined transmission procedure in order to convey to the communication station STA1 that the information is recognized and the reception unit keeps operating. The communication station STA1 having received the packet transmits an information packet addressed to the communication station STA0 in accordance with the predetermined transmission procedure after recognizing that the communication station STA0 has started an operation of a receiving device. When receiving the information packet without error, the communication station STA0 transmits an ACK as a reception acknowledgement signal. Hereupon, information indicating that there is no more information included at present in the communication station STA1 is written in the information packet received by the communication station STA0, and the communication station STA0 having recognized the above again stops operation of the reception unit and makes a transition to the intermittent reception operation.

Further, when the access point transmits broadcast information, the access point performs countdown to decide when a broadcast message is transmitted in the future and informs the count value in a beacon. For example, when broadcast information is transmitted immediately after the beacon B1-2 in FIGS. 27A to 27C, a count value is written in the beacon B1-0, a count value is written in the beacon B1-1 and a count value 0 is written in a beacon B1-3, and without receiving a beacon signal each time, a terminal station MT can receive the broadcast information by referring to the relevant count value and operating the receiving device at a point of time when the count value becomes zero.

Next, an operation of the IEEE 802.11 at the time of an ad hoc mode is explained using FIGS. 28A to 28C. In the IBSS of the ad hoc mode, a terminal station (communication station) MT autonomously defines the IBSS after a negotiation is performed among a plurality of communication stations MT. When the IBSS is defined, a communication station group sets a TBTT at a fixed interval after a negotiation. When recognizing the TBTT by referring to an internal clock of its own, each communication station MT transmits a beacon after a delay of random time in case that it is recognized that nobody has transmitted a beacon yet. In FIGS. 28A to 28C, a case where two MTs that are the communication station STA0 and the communication station STA1 form an IBSS is shown as an example. FIG. 28A shows a packet that the communication station STA1 transmits and receives, FIG. 28B shows a packet that the communication station STA0 transmits and receives, and FIG. 28C shows an operation state of the reception unit of the communication station STA0 (in a state of high level reception operation and in a state of low level reception suspension). With respect to a beacon in this case, a communication station MT of either the communication station STA0 or the communication station STA1, which belongs to the IBSS, transmits a beacon each time the TBTT has come.

In the IBSS, also there is a case in which a communication station MT turns off a power supply to a transmission-reception unit and enters a sleep state depending on necessity. When a sleep mode is applied in the IBSS, a period of time for some time from the TBTT is defined as an ATIM (Announcement Traffic Indication Message) window in the IEEE 802.11. All the communication stations MT belonging to the IBSS operate reception units during the period of time of the ATIM window, and also a communication station MT basically operating in the sleep mode is capable of receiving during this period of time.

When each communication station MT retains information addressed to another station, the fact that the station retains the information addressed to the above another station is notified to a receiving side by transmitting an ATIM packet to the above-described another station during the period of time of the ATIM window after a beacon is transmitted. The communication station MT having received the ATIM packet or the communication station MT having transmitted the beacon keeps a reception unit operating until the next TBTT.

In FIGS. 28A to 28C, when it becomes the first TBTT, each communication station MT of the STA0 and STA1 operates a back-off timer while monitoring a state of the medium over a random time. A case in which a timer of the communication station STA0 finishes counting at the earliest and the communication station STA0 transmits a beacon is shown in an example of FIGS. 28A to 28C. Since the communication station STA0 has transmitted a beacon, the communication station STA1 having received this beacon does not transmit a beacon. Further, the communication station STA0 keeps the reception unit operating until the next beacon is transmitted, because the STA0 has transmitted the beacon.

At the next TBTT, the communication station STA1 transmits a beacon in accordance with a procedure of random back-off. At this time, although the communication station STA0 operates the reception unit during the period of time defined by the ATIM window, the station STA0 receives no information from another station during this period and thereby the communication station STA0 stops the reception unit immediately after the period of the ATIM window is over and makes a transition to a sleep state until the next TBTT. Even at the next TBTT, the communication station STA1 transmits a beacon again in accordance with the procedure of random back-off. At this time, since the communication station STA0 receives an ATIM message from the communication station STA1 while keeping the receiving device operating during the period of time defined by the ATIM window, the communication station STA0 keeps the reception unit operating after the period of the ATIM window is over and receives information transmitted from the communication station STA1. Since an ACK that is a reception acknowledgement is received in response to the ATIM message, the communication station STA1 tries to transmit a data packet by activating the procedure of random back-off starting from a point of time that the ATIM window is ended after confirming that the communication station STA0 recognizes the reception. After that, both the communication stations STA1 and STA0 keep the reception units operating until the next beacon transmission.

As described above, in a wireless communication system (wireless LAN and the like) of related art, a communication station which has no information to receive turns off a power supply to a transmission-reception unit until the next TBTT and can reduce power consumption.

An example of wireless communication processing in related art using such beacon is disclosed in Published Japanese Patent Application No. H8-98255.

When the above communication control is performed, the following problems exist.

Accumulation of Data Occurring on Transmission Side

An appearance in which a packet transmission delay occurs in a system of related art is shown in FIGS. 29A to 29E.

FIG. 29A is a packet sent from an upper layer of the communication station STA1, FIG. 29B is a packet (including a beacon) transmitted and received by a MAC layer of the communication station STA1, FIG. 29C is a packet transmitted and received by a MAC layer of the communication station STA1, and FIG. 29D is a packet received by the communication station STA1 and sent to an upper layer. In addition, FIG. 29E shows a reception operation state in the reception unit of the communication station STA1. Once a reception unit is stopped, a communication station does not operate the reception unit until the next beacon transmission time. Therefore, when data is transferred from the communication station STA1 to the communication station STA0 and in such a case that information is periodically passed down from an upper layer of the communication station STA1, the next time when the communication station STA0 having made the reception unit once stopped operates the reception unit is at the time when the communication station STA1 transmits a beacon, and data from D1 to D5 passed from an upper layer of the communication station STA1 during this period are accumulated within the communication station STA1 as shown in FIGS. 29A to 29E, for example. The accumulation of data within the transmission and reception unit causes an increase (increase of latency) in round trip time (RTT) between the reception and transmission units at an application level, and there occurs a problem that throughput reaches a ceiling when ARQ using a sliding window is performed. Moreover, in order to avoid an overflow, a buffer as big as one capable of sustaining the data accumulation within the communication station STA1 that is the transmission station is needed, which causes a problem of limitation regarding hardware.

Increase in Idle Reception Period Occurring on Reception Side

Next, an idle reception period that occurs on a reception side is explained using FIGS. 30A to 30F. FIG. 30A through 30E are the same as FIGS. 29A through 29E, and FIG. 30F shows an idle period.

In addition, although a method of keeping a reception unit operating even after the reception of information is employed in related art in order to solve the above-described problem, the reception unit becomes always operating in this case as shown in FIGS. 30A to 30F, for example. Although the accumulation of data in the transmission station STA1 is certainly resolved, the reception unit is uselessly operated in the communication station STA0 that is the reception side and a problem remains from a viewpoint of power consumption since there exist a number of idle periods (period shown with an arrow in FIG. 30F) in which data reception is not performed actually though the reception unit keeps operating.

Latency of Broadcast Information

Further, although broadcast information transmitted and received in an infrastructure mode can be conveyed even if a communication station MT receives beacon information only once in several times, it is necessary to keep the transmission of the broadcast information waiting from the time when data is passed from an upper layer until countdown is ended when an access point AP intends to broadcast the data passed from the upper layer, and there occurs such a problem that a delay until the broadcast information is actually transmitted becomes large.

The present invention is made in view of those problems and aims at solving problems such as accumulation on a transmission side and delay on a reception side at the time of transmission in a communication system such as a wireless LAN system.

DISCLOSURE OF THE INVENTION

In the present invention, in communication performed in a network including a plurality of communication stations, in which access control is performed in order to make communication timing of a packet not collide with that of another station by detecting a signal transmitted from another station, each communication station in the network transmits a beacon in which information with respect to the network is written and sets a state where a reception operation is performed during a period of time before and after the transmission of the beacon signal.

According to the present invention, when transmission and reception data does not exist in each communication station in the network, for example, a system is formed based on a minimum transmission and reception operation, and data transfer can be performed with latency as small as possible in a necessary minimum transmission and reception operation by making a transition of transmission and reception operation state in accordance with fluctuating volume of transmission and reception data. Accordingly, it is possible to provide an excellent communication method and communication apparatus, as well as computer program.

BRIEF DESCRIPTION OF DRAWINGS

FIG. 12 is an explanatory diagram showing an example of a neighbor station list according to an embodiment of the present invention;

FIGS. 14A to 14D are timing charts showing an example of a transmission and reception procedure at the active level 0 according to an embodiment of the present invention;

FIGS. 15A to 15D are timing charts showing an example of a transmission and reception procedure at the active level 1 according to an embodiment of the present invention;

FIGS. 17A to 17E are timing charts showing an example of a transmission and reception procedure at the active level 2 according to an embodiment of the present invention;

FIGS. 18A to 18E are timing charts showing an example of a transition procedure to the active level 1 according to an embodiment of the present invention;

FIGS. 19A to 19E are timing charts showing an example of a transition procedure to the active level 3 according to an embodiment of the present invention;

FIGS. 20A to 20E are timing charts showing an example of a transition procedure to the active level 2 according to an embodiment of the present invention;

FIGS. 21A to 21C are explanatory diagrams showing an example of a broadcast signal transmission state according to an embodiment of the present invention;

FIG. 23 is an explanatory diagram showing a transition of a neighbor station list at the time of transmission and reception of a broadcast signal according to an embodiment of the present invention;

FIGS. 29A to 29E are timing charts showing an example of a packet transmission delay in a wireless communication system in related art; and FIGS. 30A to 30F are timing charts showing an example of reception idle time in a wireless communication system in related art.

BEST MODE FOR CARRYING OUT THE INVENTION

Hereinafter, an embodiment of the present invention is explained referring to FIGS. 1 through 25.

In this embodiment, a wireless propagation path of communication is assumed, and in which a network is formed among a plurality of devices using a single transmission medium (not a case in which a link is separated based on a frequency channel). However, even if a plurality of frequency channels exist as the transmission medium, a similar thing can be said. In addition, store-and-forward type traffic is assumed as the communication in this embodiment and information is transferred by a unit of packet.

Figure 1:
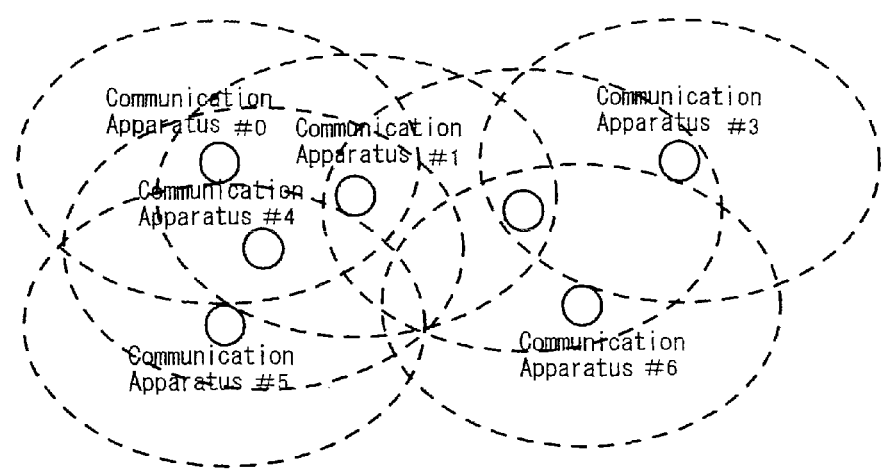
FIG. 1 is an explanatory diagram showing an example of arrangement of communication apparatuses according to an embodiment of the present invention.

An example of arrangement of communication apparatuses constituting a wireless communication system according to an embodiment of the present invention is shown in FIG. 1. In this wireless communication system, no specific control station is disposed, each communication apparatus operates in an autonomously distributed manner, and what is called an ad hoc network is formed. This figure illustrates an appearance in which communication apparatuses from #0 to #6 are distributed in the same space.

Further, a communication range of each communication apparatus is shown by a broken line in this figure, and the range is defined not only as a range in which mutual communication is possible with other communication apparatuses existing within the range, but also as a range in which a signal transmitted from each station interferes with each other. Specifically, the communication apparatus #0 exists in a range capable of communicating with the communication apparatuses #1 and #4 existing in the neighborhood, the communication apparatus #1 exists in a range capable of communicating with the communication apparatuses #0, #2 and #4 existing in the neighborhood, the communication apparatus #2 exists in a range capable of communicating with communication apparatuses #1, #3 and #6 existing in the neighborhood, the communication apparatus #3 exists in a range capable of communicating with the communication apparatus #2 existing in the neighborhood, the communication apparatus #4 exists in a range capable of communicating with the communication apparatuses #0, #1 and #5 existing in the neighborhood, the communication apparatus #5 exists in a range capable of communicating with the communication apparatus #4 existing in the neighborhood, and the communication apparatus #6 exists in a range capable of communicating with the communication apparatus #2 existing in the neighborhood.

When the communication is performed between certain specific communication apparatuses, there exists such a communication terminal, what is called a hidden terminal, that can be heard by a communication apparatus of one side which becomes a communication partner but can not be heard by the other communication apparatus.

Figure 2:
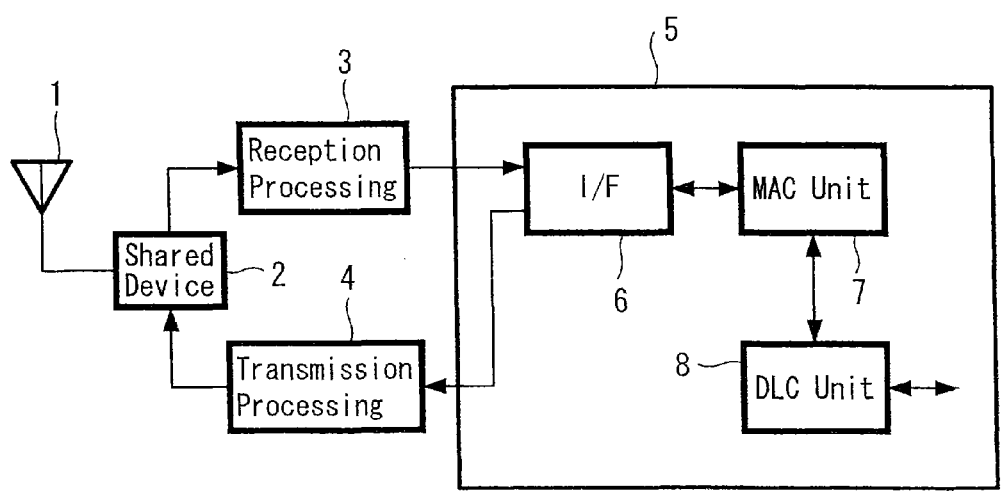
FIG. 2 is a block diagram showing an example of a configuration of a communication apparatus according to an embodiment of the present invention.

FIG. 2 is a block diagram showing an example of a configuration of a wireless transmission and reception apparatus constituting a communication station applied to the system of this embodiment. In this example, an antenna 1 is connected to a reception processing unit 3 and a transmission processing unit 4 through an antenna shared device 2, and the reception processing unit 3 and the transmission processing unit 4 are connected to a base-band unit 5. Various communication methods which are applicable to, for example, a wireless LAN and which are suitable for communication of a comparatively short range can be applied with respect to a reception processing method in the reception processing unit 3 and a reception processing method in the transmission processing unit 4. Specifically, a UWB (Ultra Wideband) method, an OFDM (Orthogonal Frequency Division Multiplex) method, a CDMA (Code Division Multiple Access) method, and the like can be applicable.

The base-band unit 5 includes an interface unit 6, a MAC (Media Access Control) unit 7, a DLC (Data Link Control) unit 8, and the like, and processing in each layer in an access control method mounted on this communication system is performed in respective processing units.

Figure 3:
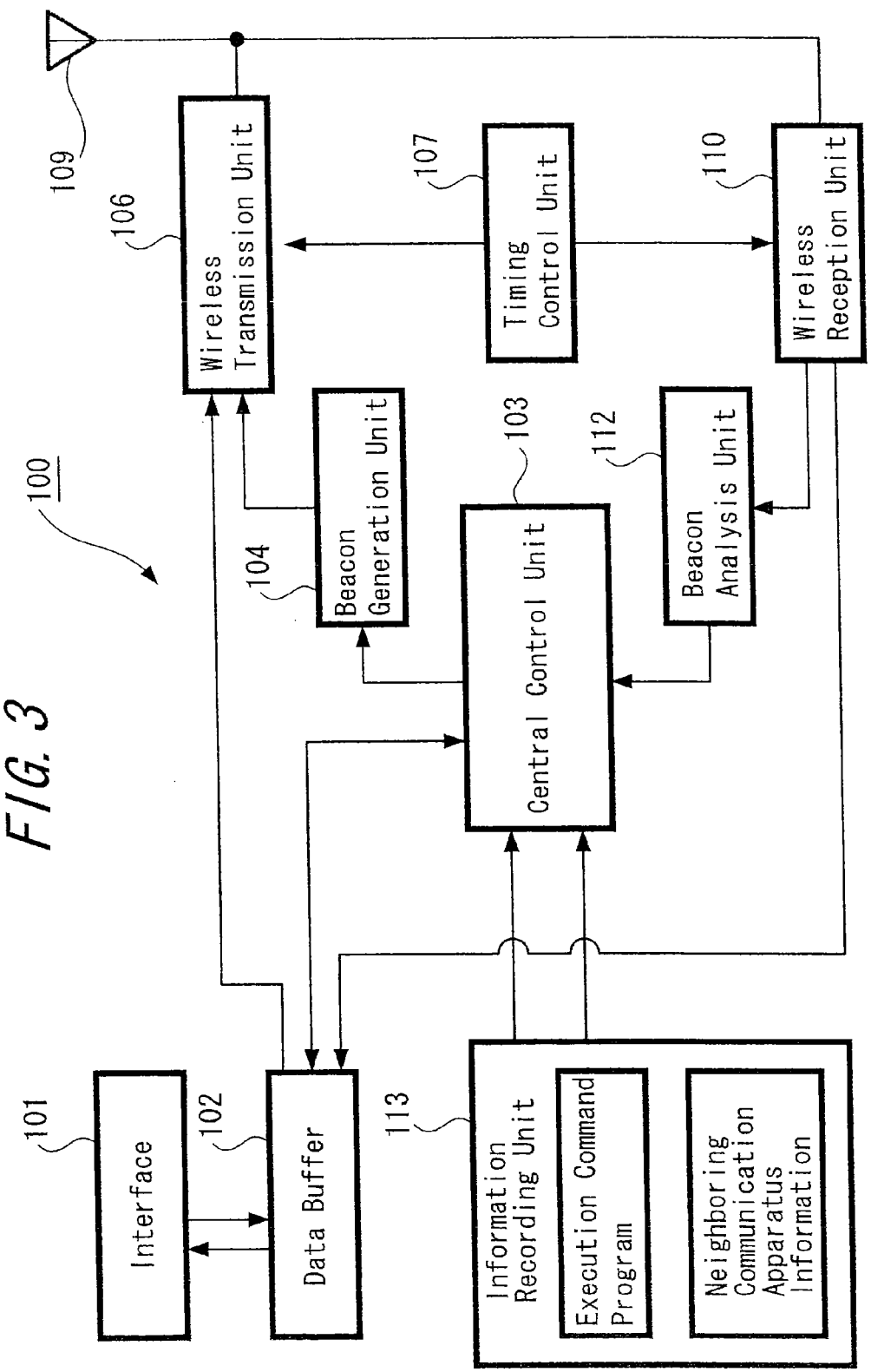
FIG. 3 is a block diagram showing in detail an example of a configuration of a communication apparatus according to an embodiment of the present invention.

FIG. 3 shows in further detail a functional configuration of a wireless communication apparatus which operates as a communication station in a communication network according to an embodiment of the present invention. Under an autonomous distributed type communication environment in which a control station is not disposed, the wireless communication apparatus shown in this figure can form a network by efficiently performing a channel access within the same wireless system while avoiding a collision.

As shown in the figure, a wireless communication apparatus 100 includes an interface 101, a data buffer 102, a central control unit 103, a beacon generation unit 104, a wireless transmission unit 106, a timing control unit 107, an antenna 109, a wireless reception unit 110, a beacon analysis unit 112, and a information memory unit 113.

The interface 101 exchanges various information sets with an external device (for example, a personal computer (not shown in the figure), and the like) connected to the wireless communication apparatus 100.

The data buffer 102 is used to temporarily store data sent from a connected device through the interface 101 and data received through a wireless transmission path before sent through the interface 101.

The central control unit 103 unitarily performs a series of management of information transmission and reception processing and access control of the transmission path in the wireless communication apparatus 100. Operation control such as collision avoidance processing at the time of beacon collision, for example, is performed in the central control unit 103.

The beacon generation unit 104 generates a beacon signal which is periodically exchanged with a wireless communication apparatus existing in the neighborhood. In order for the wireless communication apparatus 100 to operate the wireless network, a beacon transmission position thereof, a beacon reception position from a neighboring station, and the like are defined. The information is stored in the information memory unit 113 and at the same time, is written in a beacon signal and a wireless communication apparatus in the neighborhood is informed thereof. A structure of the beacon signal is described later on. Since the wireless communication apparatus 100 transmits a beacon at the head of a transmission frame cycle, the transmission frame cycle in a channel used by the wireless communication apparatus 100 is defined by a beacon interval.

The wireless transmission unit 106 performs predetermined modulation processing in order to wirelessly transmit data and a beacon signal temporarily stored in the data buffer 102. Further, the wireless reception unit 110 performs reception processing of a signal such as information and a beacon, which is sent from another wireless communication apparatus at the predetermined time.

Various communication methods which are applicable to a wireless LAN and which are suitable for communication of a comparatively short range, for example, can be applied as a wireless transmission and reception method in the wireless transmission unit 106 and in the wireless reception unit 110. Specifically, the UWB (Ultra Wide Band) method, the OFMD (Orthogonal Frequency Division Multiplexing) method, the CDMA (Code Division Multiple Access) method, and the like can be employed.

The antenna 109 wirelessly transmits a signal addressed to another wireless communication apparatus on a predetermined frequency channel, or collects a signal sent from another wireless communication apparatus. In this embodiment, it is assumed that a single antenna is provided and transmission and reception may not be performed together in parallel.

The timing control unit 107 performs control over timing to transmit and to receive a wireless signal. For example, own beacon transmission timing at the head of the transmission frame cycle, beacon reception timing from other communication apparatuses, data transmission timing to and data reception timing from another communication apparatus, scan operation cycle, and the like are controlled.

The beacon analysis unit 112 analyzes the beacon signal received from a neighboring station and analyzes the existence of a wireless communication apparatus in the neighborhood, and the like. For example, information such as reception timing of a beacon in a neighboring station and neighboring beacon reception timing is stored in the information memory unit 113 as neighboring apparatus information.

The information memory unit 113 stores an execution procedure command (program in which a collision avoidance processing procedure and the like are described) on a series of access control operation and the like which is executed in the central control unit 103, and also stores the neighboring apparatus information and the like obtained from the result of analyzing the received beacon.

In the autonomous distributed type network according to this embodiment, each communication station informs beacon information at a predetermined time interval on a predetermined channel and thereby makes another communication station existing in the neighborhood (specifically, within a communication range) know of the existence thereof and notifies another station of a network configuration. Hereupon, the beacon transmission cycle is defined as a super frame, and is assumed to be 80 ms, for example.

A communication station newly entered detects that the communication station has entered a communication range while hearing a beacon signal from a neighboring station by a scan operation, and is able to know a network configuration by decoding information written in the beacon. Further, beacon transmission timing thereof is set to timing at which a beacon is not transmitted from a neighboring station while synchronizing gradually with reception timing of the beacon.

Next, communication processing operation performed in a wireless network including a plurality of communication apparatuses according to this embodiment is explained.

A wireless communication system assumed in this embodiment is an example of a case where each communication station transmits a beacon signal at a fixed time interval using a prepared transmission path and informs other communication stations of the presence thereof. Further, effectiveness expected in this embodiment is also efficient in a wireless communication system in general which shares a transmission path by time division.

Figure 4:
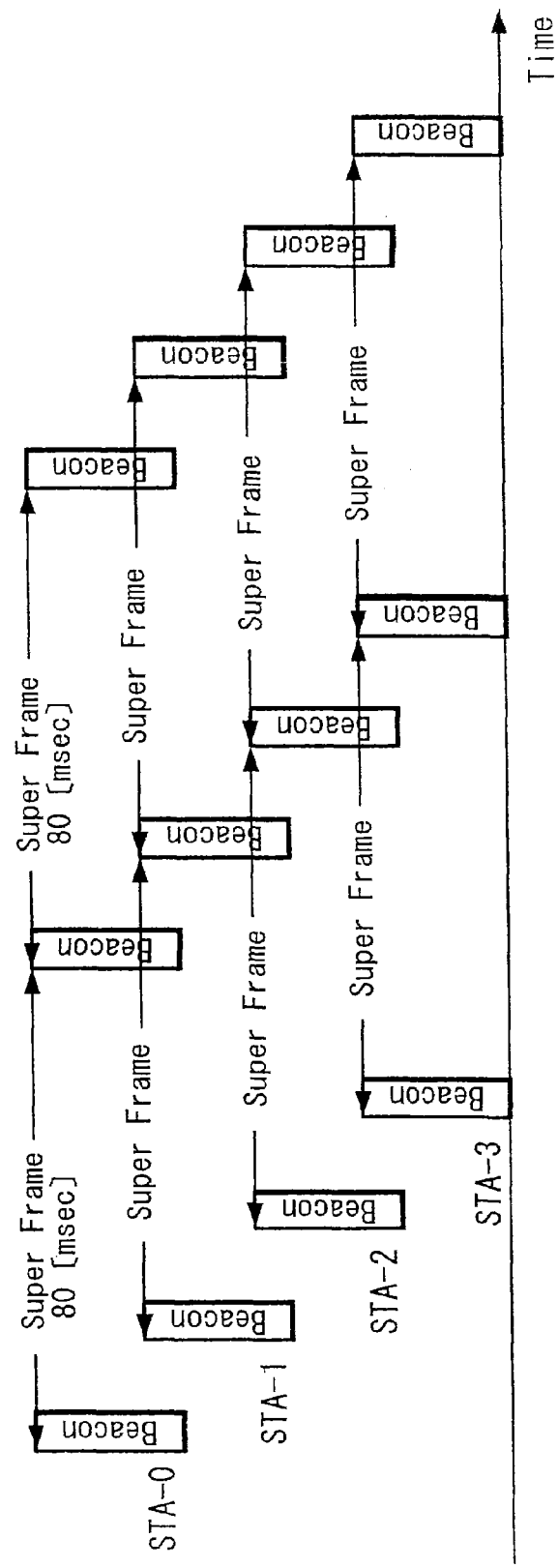
FIG. 4 is an explanatory diagram showing an example of a beacon transmission interval according to an embodiment of the present invention.

FIG. 4 shows an example of a beacon transmission interval in the wireless communication system of this embodiment. In the example of FIG. 4, a case in which there exist four communication stations of STA0, STA1, STA2, and STA3 is referred to as an example. Each communication station participating in the network periodically transmits a beacon at a super frame interval in order to make the existence of the communication station known to the neighbors. Hereupon, it is assumed that one cycle is [msec], and hereinafter an explanation is made using a case in which the beacon is transmitted at every 80 [msec], but the cycle is not necessarily limited to 80 [msec]. If information transmitted with the beacon is 100 bytes, time required for transmission becomes 18 [.mu.sec]. Since the transmission is performed once every 80 [msec], a medium occupancy rate of the beacon for one communication station is $1/4444$ which is sufficiently small. Since a beacon is transmitted even when a transmission signal has not reached a station, the beacon looks meaningless but does not become a big problem due to a reason that the transmission time rate is $1/4444$ and is sufficiently small.

Each communication station synchronizes gradually while receiving and confirming a beacon transmitted from a communication station existing in the neighborhood. When a communication station appears newly in the network, the new communication station sets beacon transmission timing thereof to timing at which a beacon is not transmitted from a communication station existing in the neighborhood. As described above, and also since the beacon transmission time of each communication station is offset against each other as shown in the figure, the beacon transmission timing thereof is controlled while receiving a neighboring beacon such that beacon signals do not overlap with each other.

Figure 5:
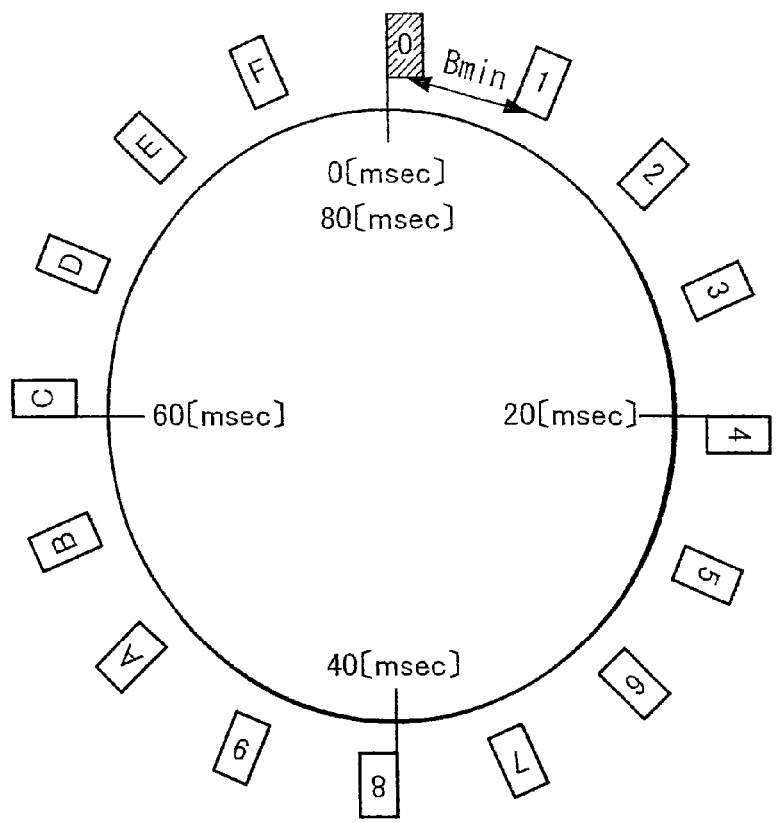
FIG. 5 is an explanatory diagram showing an example of beacon transmission timing according to an embodiment of the present invention.

FIG. 5 shows an example of a configuration of beacon transmission timing that can be disposed in a super frame. In the example shown in this figure, a lapse of time in the super frame made of 80 msec is illustrated like a clock in which a needle of hour hand moves clockwise on a circular ring.

In the example shown in FIG. 5, positions 0 to F of total sixteen are formed as "slots" in which the time when the beacon transmission can be performed, that is, the beacon transmission timing can be arranged. As explained by referring to FIG. 2, it is assumed that disposition of a beacon is performed in accordance with such an algorithm that beacon transmission timing of a newly entered station is sequentially set at timing approximately in the middle of a beacon interval which has been set by an existing communication station. When Bmin is defined as 5 ms, the number of beacons that can be disposed are sixteen at maximum per super frame. Specifically, the number of communication stations that can enter the network are sixteen at maximum.

Although not explicitly illustrated in FIGS. 4 and 5, each beacon is transmitted at a time intentionally having some time offset from the TBTT (Target Beacon Transmission Time) that is each beacon transmission time. This is called "TBTT offset". A TBTT Offset Indicator Sequence (TOIS) field where the TBTT offset is set as described above is defined beforehand. A beacon transmission offset value showing the amount of intentional offset of transmission of a beacon at this time in comparison with the TBTT is written in the TOIS. In this embodiment, the TBTT offset value is determined by a pseudo-random number. This pseudo-random number is determined by a pseudo-random sequence TOIS (TBTT Offset Indication Sequence) in which the number is uniquely decided, and the TOIS is renewed in every super frame cycle.

By providing the TBTT offset, the actual beacon transmission time of two communication stations, even when two communication stations have beacon transmission timing disposed in the same slot on the super frame, can be made to have an offset, and since each communication station can mutually hear each other's beacons in another super frame cycle (or, a communication station existing in the neighborhood can hear both the beacons) even if beacons collide with each other in a certain super frame cycle, the occurrence of collision of the beacon thereof can be recognized. A communication station informs a neighboring station of a TOI which is set in every super frame cycle and which is included in beacon information.

Further, in this embodiment, each communication station is obliged to perform a reception operation before and after transmitting a beacon, when transmission and reception of data is not performed. In addition, even when the transmission and reception of data is not performed, it is also obliged to perform a scan operation by operating a receiving device continuously over one super frame once every several seconds (this time interval is defined as "T_SCAN" in this specification) and to confirm whether there is any change in the presence of neighboring beacon or whether there is a shift in the TBTT of each neighboring station. Further, when it is confirmed that there is a shift in the TBTT, the TBTT having a shift within −Bmin/2 ms is defined to be "advanced" and the TBTT having a shift within +Bmin/2 ms is defined to be "delayed" based on the TBTT group recognized by the station, and the time is adjusted conforming to the most delayed TBTT.

NBOI Field

Figure 6:
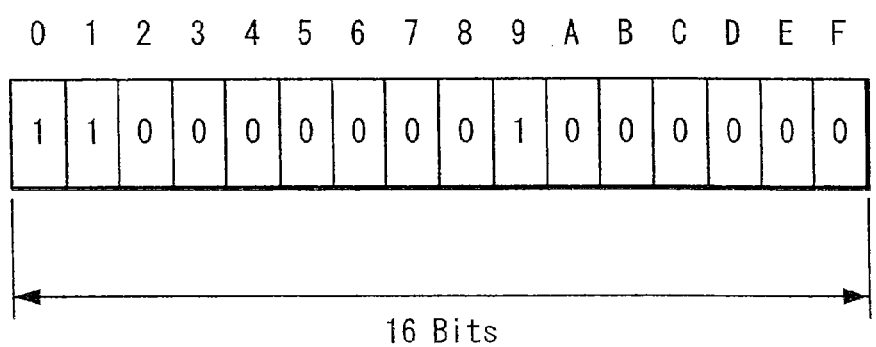
FIG. 6 is an explanatory diagram showing part of information written in a beacon according to an embodiment of the present invention.

Further, FIG. 6 shows an example of description of a Neighboring Beacon Offset Information (NBOI) field as one piece of information transmitted by a beacon. In the NBOI, a position of a beacon which the relevant station can receive (reception time) is written in a bit map by a relative position (relative time) from a position of a beacon thereof (transmission time). In the example shown in FIG. 6, although a case where the minimum interval is Bmin=5 [msec] and only sixteen kinds of beacon transmission positions can exist is referred to as an example and accordingly an NBOI field length becomes 16 bits, the length is not necessarily limited to 16 bits.

FIG. 6 shows an example of an NBOI field in which a communication station [No. 0] in FIG. 5 informs that "a beacon from a communication station [No. 1] and a communication station [No. 9] can be received". With respect to a bit corresponding to a relative position of a beacon to which the reception is possible, a mark is assigned when a beacon is received and a space is assigned when a beacon is not received. The 0.sup.th bit, the 1.sup.st bit, and .sup.th bit are marked in the example of FIG. 6. The mark in the 0.sup.th bit shows that the beacon of the relevant station is transmitted, and the mark in the 1.sup.st bit shows that a beacon is received at timing delayed by Bmin*1 from the TBTT of this beacon. Similarly, the mark in the 9.sup.th bit shows that a beacon is received at timing delayed by Bmin*9 from the TBTT of this beacon.

Here, for a purpose other than the above, for example, such as a case where a supplementary beacon is transmitted, a mark may be assigned with respect to a bit corresponding to timing at which a beacon is not received, though details are described later on.

NBAI Field

Further, a Neighboring Beacon Activity Information (NBAI) field similar to the NBOI field is defined here as information similarly transmitted by a beacon. In the NABI field, a position of a beacon which the relevant station actually receives (reception time) is written with a bit map in a relative position from a position of a beacon thereof. Specifically, the NBAI field shows that the station is in an active state capable of receiving. Furthermore, information that the station receives a beacon at the specified beacon position in the super frame is provided by two information of the above-described NBOI and NBAI. That is, each communication station is informed of the following 2-bit information by the NBOI and NBAI fields included in the beacon. TABLE-US-00001 NBAI NBOI DESCRIPTION 0 0 Existence of a beacon is not recognized at the time. 0 1 Existence of a beacon is recognized at the time. 1 0 Being in an active state at the time. 1 1 Reception of beacon is being performed at the time.

Processing for Taking OR of NBOI/NBAI

Figure 7:
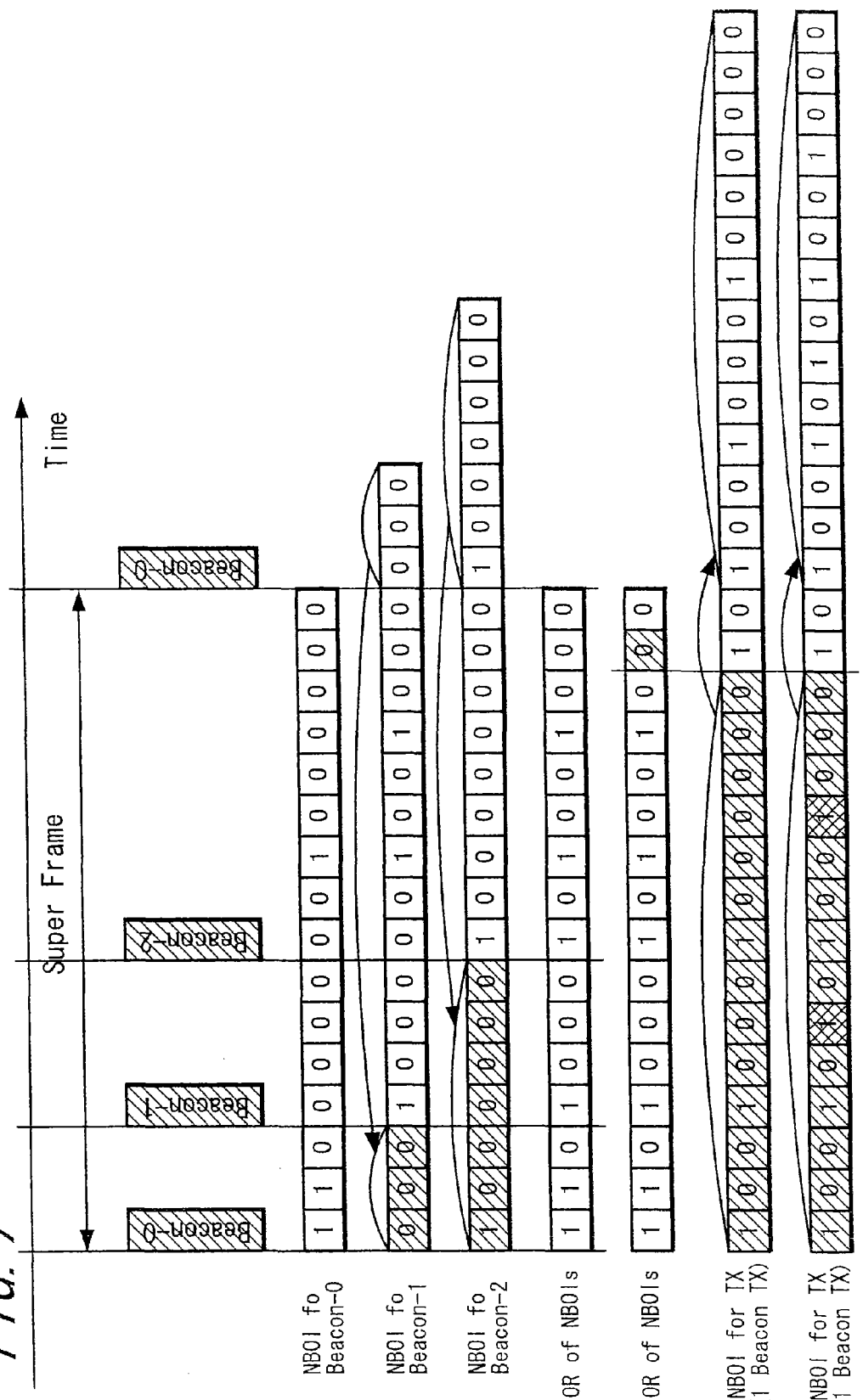
FIG. 7 is an explanatory diagram showing an example of a NBOI and NBAI processing procedure according to an embodiment of the present invention.

FIG. 7 shows a view until a newly entered communication station A sets TBTT thereof based on NBOI of each beacon obtained from a beacon which is received from a neighboring station by a scan operation.

It is assumed that the communication station is able to receive beacons from three stations 0 through 2 within a super frame by the scan operation.

The beacon reception time of a neighboring station is treated as a relative position to a normal beacon of the scanning station, and is described in an NBOI field with a bit map form (as described above). Then, in the communication station A, NBOI fields of the three beacons having received from the neighboring stations are shifted in accordance with the reception time of each beacon, and after corresponding positions of bits are aligned on a time axis, the NBOI are integrated for reference by taking OR of NBOI bits of each timing. Explaining specifically a procedure thereof, the beacon 1 is received in a delay of three slots on the basis of transmission timing of the beacon 0. The communication station retains this information in a memory or the like. Further, after three slots in the back of the NBOI field included in the beacon 1 are shifted to the front, this information is retained in the memory or the like (second tier in FIG. 7). Similar processing is also performed on the beacon 2 (third tier in FIG. 7).

A sequence obtained as a result of reference after the integration of the NBOI fields of neighboring stations is "1101, 0001, 0100, 1000" shown by "OR of NBOIs" in FIG. 7. The mark 1 indicates a relative position of the timing at which the TBTT is already set in the super frame, and the space 0 indicates a relative position of the timing at which the TBTT is not set. In this sequence, a place where the space (0) becomes the longest run length is a possible position for newly disposing a beacon. In the example shown in FIG. 7, the longest run length is three, and there can exist two possible positions. Then, the communication station A decides the 15.sup.th bit among them as the TBTT of the normal beacon thereof.

The communication station A starts transmission of a beacon after setting the time of the 15.sup.th bit as the TBTT of the normal beacon thereof (namely, the head of the super frame thereof). At this time, the NBOI field transmitted by the communication station A becomes as shown by "NBOI for TX (1 Beacon TX)" in FIG. 7, in which each reception time of the beacon of the communication stations 0 through 2 whose beacon can be received by the station A is written in the bit map form marking the bit position corresponding to the relative position from the transmission time of the normal beacon thereof.

Further, when the communication station A transmits an auxiliary beacon for a purpose of obtaining a priority transmission right and the like, the longest run length of the space (0) in the sequence shown by "OR of NBOIs" which integrates the NBOI fields of the neighboring stations is further searched and the transmission time of the auxiliary beacon is set at a position of the space found. A case where two auxiliary beacons are transmitted is assumed in the example shown in FIG. 7, and transmission timing of the auxiliary beacon is set at the time of space of the 6.sup.th bit and at the time of space of the 11.sup.th bit in "OR of NBOIs". In this case, the NBOI field transmitted by the communication station A is also marked in a place where the station transmits the auxiliary beacon (relative position to the normal beacon) in addition to the normal beacon thereof and the relative position of the beacon received from the neighboring station, and this NBOI field becomes as shown by "NBOI for TX (3 Beacon TX)".

In the case where each communication station performs transmission of a beacon by setting the beacon transmission timing TBTT thereof in such a processing procedure as the one described above, a collision of beacons can be avoided under a condition that each communication station stands still so that a reaching range of an electric wave does not fluctuate. In addition, since an auxiliary beacon (or a signal similar to a plurality of beacons) is transmitted within a super frame according to the priority of transmission data, resources can be preferentially allocated to provide QoS communication. Further, since each communication station can autonomously obtain a saturation level of a system by referring to the number of beacons (NBOI fields) received from neighbors, it becomes possible to accommodate priority traffic in consideration of the saturation level of the system for each communication station despite of a distributed control system. Further, since each communication station refers to a NBOI field of a received beacon and the beacon transmission time is disposed not to collide with each other, it is possible to avoid such a situation that a collision occurs frequently even when a plurality of communication stations accommodate priority traffic.

Thus, when a communication station newly enters a network, the center of a period where a run length of the space becomes the longest is determined as beacon transmission timing based on a result of a sum of NBOI obtained from a beacon received from each communication station.

The example of referring to the NOBI fields by the OR is shown in the explanation above, further in case of an NBAI field, control is performed not to transmit at the beacon transmission time of marked timing by a similar procedure of referring to a sum (OR).

Specifically, when a communication station transmits some information, a beacon transmitted from a neighboring communication station is received as needed, and control is performed not to transmit at the beacon transmit time of marked timing based on a result of a sum (OR) of an NBAI field obtained from a beacon received from each communication station.

Figure 8:
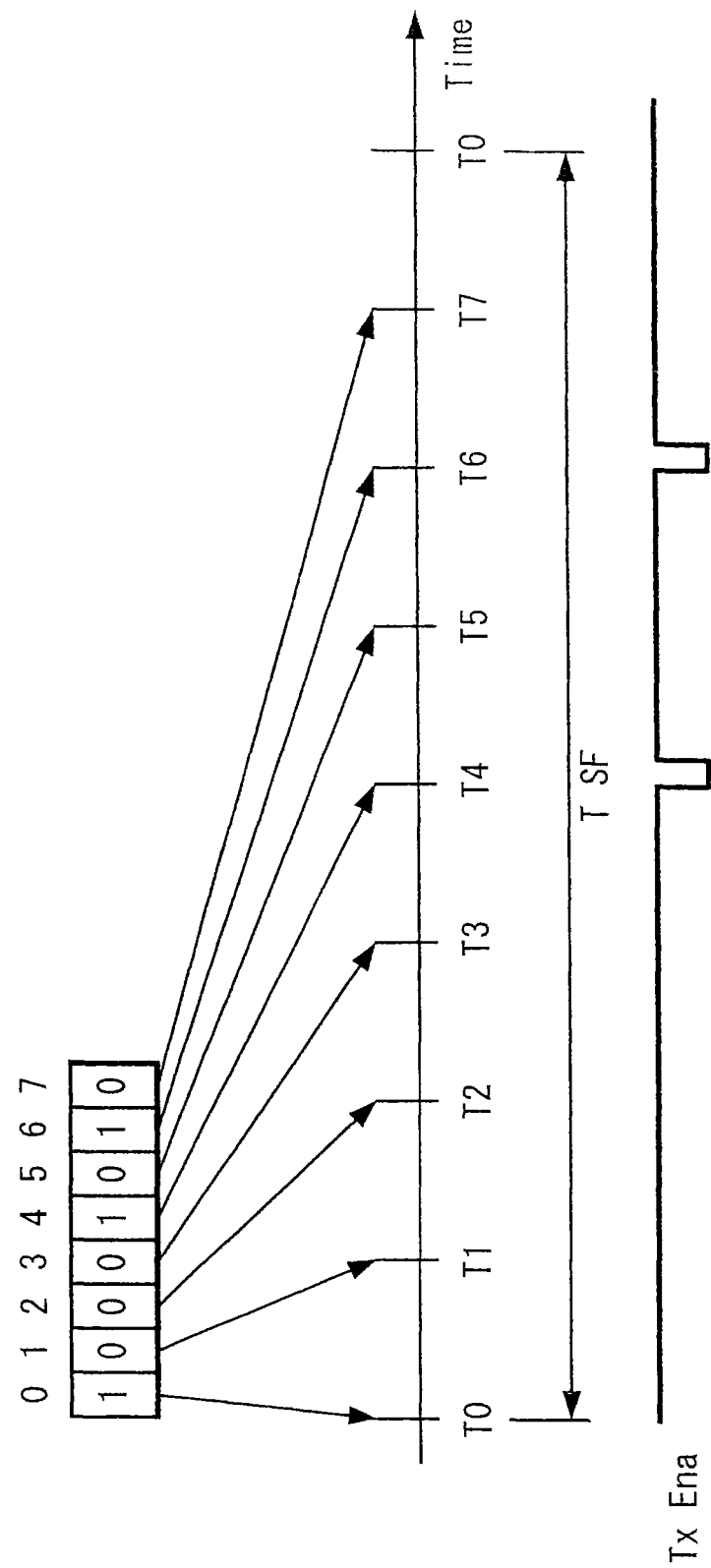
FIG. 8 is an explanatory diagram showing an example of a definition of a transmission disapproval period according to an embodiment of the present invention.

FIG. 8 shows processing at this time. Here, a case where an NBAI field has eight bits is shown as an example, in which the 0.sup.th bit, the 4.sup.th bit and the 6.sup.th bit are marked as a result of a sum (OR) of respective NBAI fields of reception beacons obtained in accordance with the above-described procedure. The 0.sup.th bit is a beacon thereof, and additional processing is not specifically performed. Since the 4.sup.th bit is marked, a transmission permission flag thereof is lowered so as not to perform transmission at the time T4 that is the beacon transmission time of the 4.sup.th bit. Further, similarly with respect to the 6.sup.th bit the transmission permission flag thereof is lowered so as not to perform transmission at the corresponding time T6. Accordingly, when a certain communication station wishes to receive a beacon of another communication station, there is no such case that a transmission station interrupts the reception thereof and highly reliable transmission and reception can be performed.

Transmission Prioritized Period TPP

Figure 9:
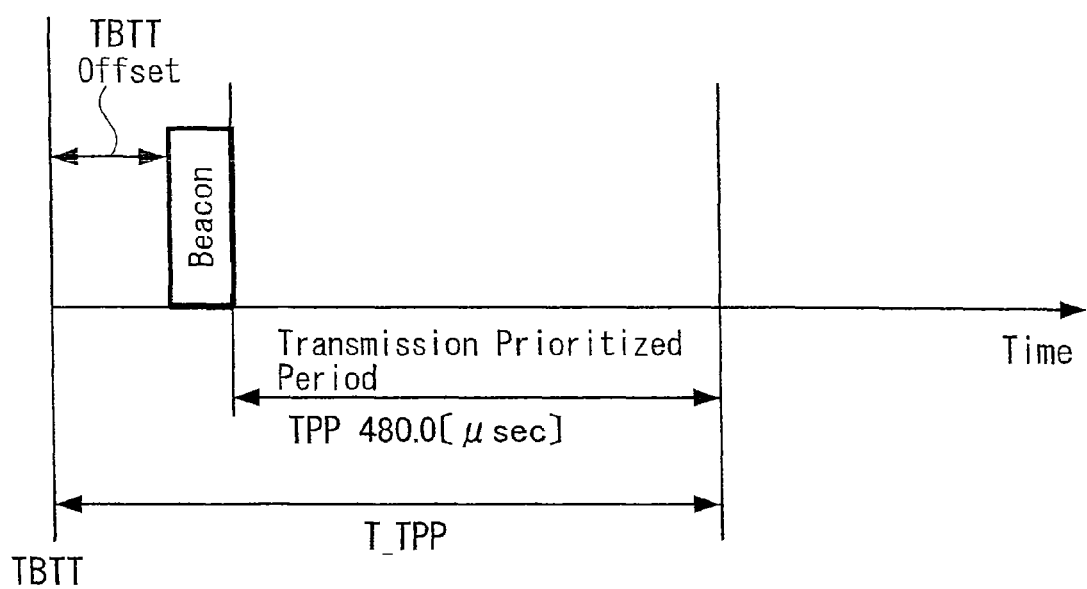
FIG. 9 is an explanatory diagram showing an example of a transmission prioritized period according to an embodiment of the present invention.

Each communication station transmits a beacon at a fixed interval, and in this embodiment after a beacon is transmitted, the priority of transmission for a while is given to a station having transmitted the beacon. FIG. 9 shows a view in which the priority of transmission is given to a beacon transmission station. FIG. 9 shows as an example a case where 480 [.mu.sec] is given as the transmission prioritized period. This prioritized period is defined as a Transmission Prioritized Period (TPP). The TPP starts immediately after beacon transmission and ends at the time after a lapse of T_TPP from TBTT. Since each communication station transmits a beacon in each super frame, the TPP of the same time rate is basically distributed to each communication station. After a TPP of one communication station ends, a period until another communication station transmits a beacon becomes a Fairy Access Period (FAP). In the Fairy Access Period (FAP), a fair medium acquisition competition is performed by an ordinary CSMA/CA method (or, a PSMA/CA method described later on).

Figure 10:
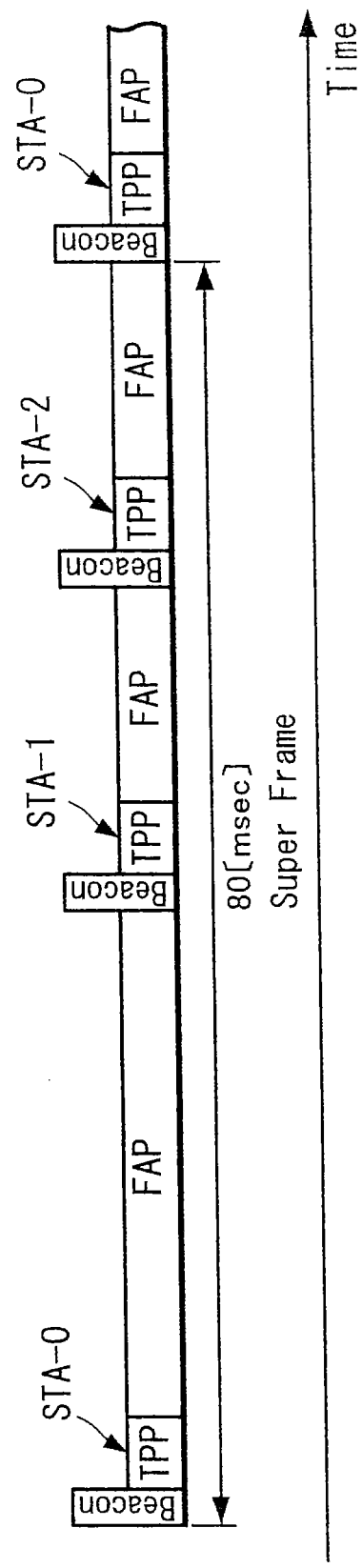
FIG. 10 is an explanatory diagram showing an example of a structure of a super frame according to an embodiment of the present invention.

FIG. 10 shows a structure of a super frame. As shown in this figure, subsequently to transmission of a beacon from each communication station, a TPP is allocated to the communication station having transmitted the beacon, a FAP is started after time lapses by a length of the TPP, and the FAP ends when a beacon is transmitted from a next communication station. It should be noted that an example in which the TPP starts immediately after the transmission of the beacon is shown herein, however not limited to this example, the start time of the TPP may be set at a relative position (time) from the transmission time of a beacon, for example. In addition, there is also a case in which the TPP is defined as 480 [.mu.sec] from the TBTT. In addition, as shown in FIG. 9, since a range of the TPP ends after the period of T_TPP from the TBTT as a basis, the range of the TPP is deleted when the transmission time of a beacon delays due to TBTT offset.

An example of a typical transmission and reception procedure of a communication station is explained using FIGS. 11A to 11C. In FIGS. 11A to 11C, an explanation with respect to the communication station STA0 and the communication station STA1 is made by referring a case, in which transmission is performed from the communication station STA0 to the communication station STA1, as an example. Each communication station does not necessarily receive a beacon signal of another station each time. There is also a case where a frequency of reception is lowered by instructions and the like from an upper layer. FIG. 11A shows a sequence chart of a packet transmitted and received between the communication stations STA0 and STA1; FIG. 11B shows a state of the transmission unit of the communication station STA0; and FIG. 11C shows a state of the reception unit of the communication station STA0. With respect to the state of the transmission and reception units, a high level shows an active state (a state of trying transmission or reception) and a low level shows a sleep state.

First, the communication station STA0 transmits a beacon after confirming that a medium is clear. It is assumed that the communication station STA1 is called up in TIM and (or) PAGE in this beacon. The communication station STA1 having received this beacon makes a response to the paging information (0). Since this response corresponds to the middle of the TPP of the communication station STA0 and the priority right has been obtained, the transmission is performed at a SIFS interval. After that, since the transmission and reception during the TPP between the communication station STA1 and the communication station STA0 has the priority right, transmission is performed at the SIFS interval. After confirming that the communication station STA1 is in a state capable of receiving, the communication station STA0 having received the response transmits a packet addressed to the communication station STA1 (1). Further, since there exists another packet addressed to the communication station STA1 in FIG. 11A, one more packet is transmitted (2). The communication station STA1 having received two packets transmits an ACK after confirming that those packets are received properly (3). After that, the communication station STA0 transmits the last packet (4). However, while receiving the previous ACK, the TPP of the communication station STA0 is ended and the FAP is already started at the time of transmission of (4). Since there is no priority right of transmission in the FAP, the transmission is performed at an interval of LIFS+back-off with respect to the packet (4). An ACK corresponding to the packet (4) is transmitted by the communication station STA1 (5).

Figure 11:
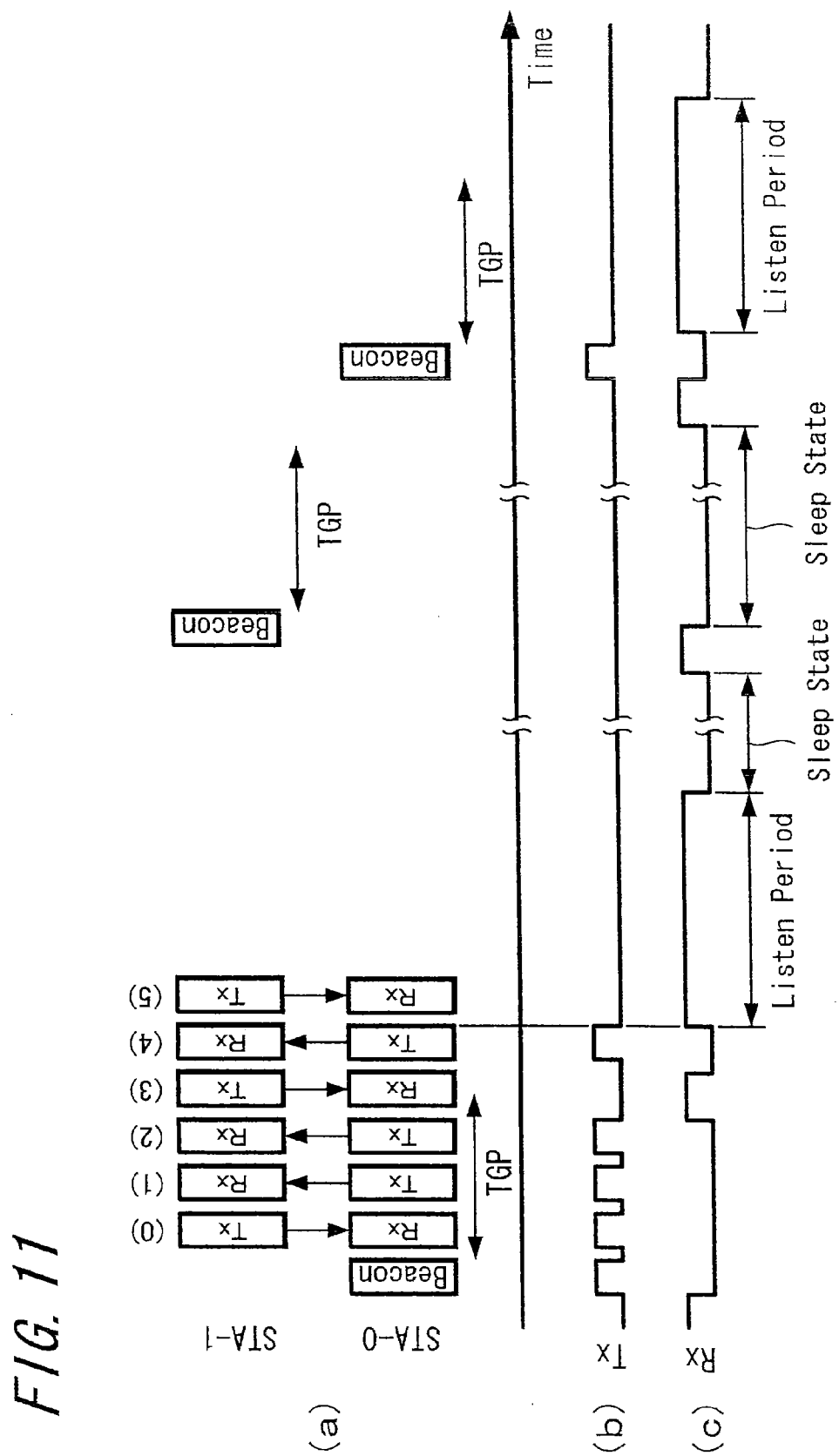
FIG. 11 is a timing chart showing an example of a communication state in a communication station according to an embodiment of the present invention.

A certain period of time after the last transmission is performed is defined as a Listen Window, and each communication station is obliged to operate a receiving device. FIG. 11 also shows the aspect thereof. When there exists no reception packet during a listen period, the communication station changes a state to a sleep state and stops a transmission and reception device to try to reduce power consumption. Details of power saving operation of each terminal is explained in the followings.

Definition of Activity Level

Power saving is automatically practiced at the time when transmission and reception of data is not performed, and at the time when transmission and reception of data is performed, a corresponding processing procedure is operated. An intermittent operation rate of an MAC layer fluctuates according to the presence or absence of transmission and reception data.

Figures 13A, 13B:
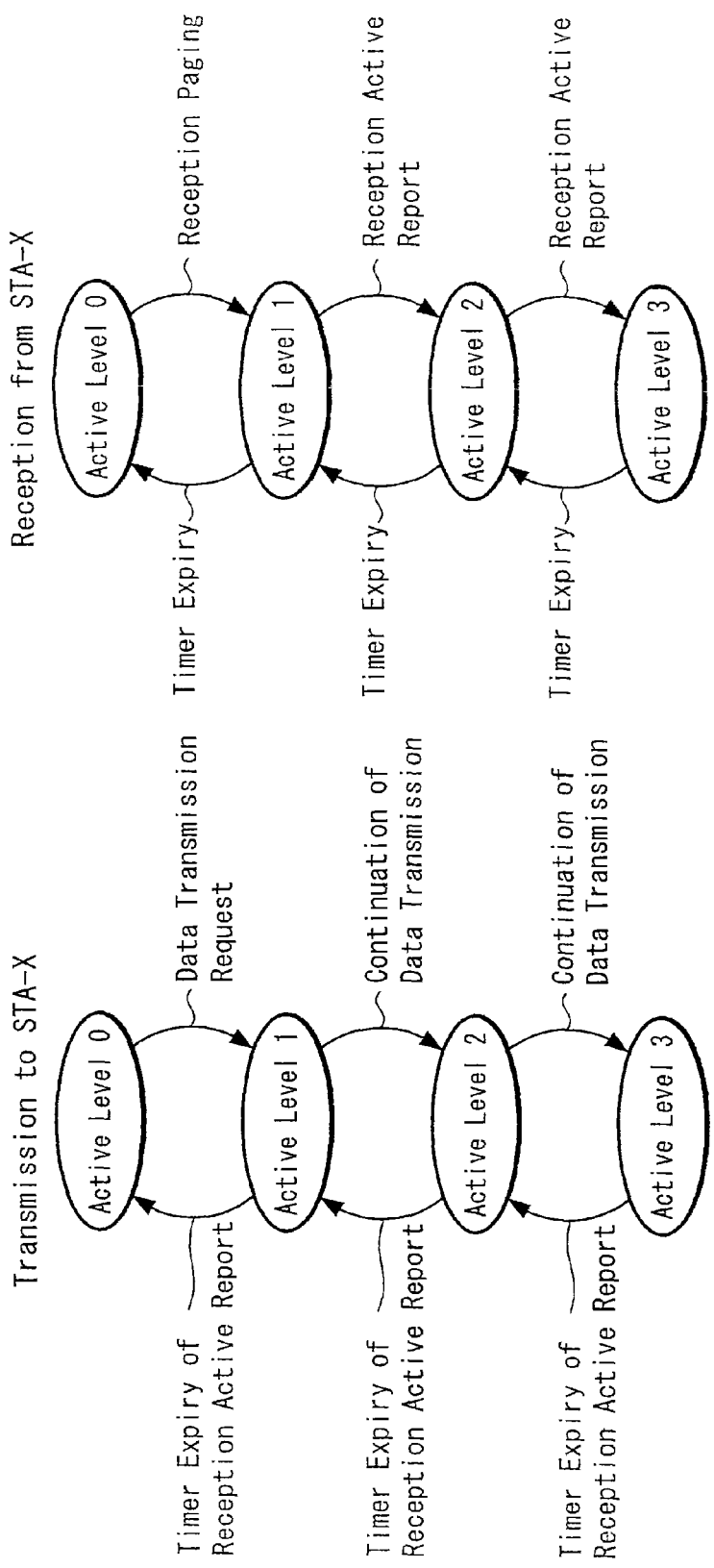
FIGS. 13A and 13B are explanatory diagrams showing an example of transition of an activity level according to an embodiment of the present invention.

FIG. 13 is a diagram showing a definition and a transition of an activity level which is set to each communication terminal in this embodiment. Hereupon, four stages from an active level 0 to an active level 3 are defined based on an operation rate and the like. Although a detailed transmission and reception procedure of each activity level is described later on, brief explanation is made here with respect to each activity level.

The active level 0 corresponds to a state in which information and a signal are not transmitted and received with another station. This active level 0 is a state in which a receiving device is only operated at the time of transmission of a beacon and around beacon transmission timing. When data to be transmitted is generated from an upper layer or when being called up from another station under this state, a transition is made to the active level 1.

The active level 1 corresponds to a state in which transmission and reception is performed with a specific station (or, all communication stations existing in the neighborhood) in a minimum level of band. This active level 1 is a state in which transmission and reception processing is performed mutually regarding to transmission and reception of a beacon, and the transmission and reception of data and the like is performed as a result thereof. When it is judged that the volume of data to be transmitted and received becomes too much to handle by the active level 1, a transition is made to the active level 2.

The active level 2 is a state in which a transmission trigger is generated dispersively in between the transmission time of a beacon transmitted in each super frame, and transmission and reception of data is performed even at a point of time that the transmission trigger is activated. When it is judged that the volume of data to be transmitted and received becomes too much to handle by the active level 2, a transition is made to the active level 3.

The active level 3 corresponds to a state in which transmission and reception of data is performed in all period of times. A transmission station and a reception station perform continuously a transmission and reception operation, and a transmission procedure is started immediately when data to be transmitted is generated on the transmission side.

When it is judged that time during which the volume of data to be transmitted is judged small becomes sufficiently long (that is managed using a timer, for example) in each activity level, a transition is made to an activity level of one level below.

Neighboring Station List (Neighbor List)

FIG. 12 is a diagram showing a part of a neighbor list in this embodiment.

Each communication station retains neighboring station information by each station, and this information is managed in a form called the neighbor list. In the neighbor list, transmission timing of a beacon, a state of propagation path with the relevant station, and the like are stored with respect to each station.

In this embodiment, the activity level of each neighboring station is separately obtained and managed with respect to transmission and reception in this neighbor list. In FIG. 12, examples of neighbor lists of the communication station STA0 (left side of FIG. 12) and the communication station STA1 (right side of FIG. 12) in FIG. 4 is shown. In the neighbor list of the communication station STA0, data on three stations of communication stations STA1, STA2 and STA3 from which the communication station STA0 can receive a beacon is registered as a record, in which the activity level referred to at the time of transmission and the activity level referred to at the time of reception are written with respect to each station. In the example shown here, a case where both the communication stations STA0 and STA1 are in the activity level 0 (shown as ACT-0 in the figure) in both transmission and reception with respect to all stations is described.

Operation at the Time of Active Level 0

FIGS. 14A to 14D are diagrams showing a transmission and reception procedure in the case of the active level 0. In this figure, an explanation is made with respect to the communication station STA0 and the communication station STA1. FIG. 14A is a state of reception operation in the communication station STA0, FIG. 14B is a state of transmission in the communication station STA0, FIG. 14C is a state of transmission in the communication station STA1, and FIG. 14D is a state of reception operation in the communication station STA1. With respect to the state of reception operation, a high level shows the reception operation, and a low level shows suspension of reception operation (those are similar regarding a state of reception operation in the figures on and after FIG. 15). Hereinafter, an explanation is made using similar figures.

In the active level 0, each communication station operates a reception unit prior to the beacon transmission time thereof in order to judge whether a medium is clear; transmits a beacon at the beacon transmission time when the medium is clear; subsequently operates the reception unit over a period of time called the above-described listen window; and stops transmission and reception units until the next beacon transmission if data addressed thereto is not received. Specifically, the active level 0 is a state to perform a minimum necessary level of transmission and reception processing, and is a mode to perform a lowest power consumption operation. The following operations are performed in the active level 0.

Beacon transmission operation in each super frame cycle (T_SF)

Reception operation during a listen window after the beacon transmission

Scan operation performed over a super frame cycle (T_SF) at each T_SCAN

In the active level 0, Latency required for data transmission and reception becomes the super frame cycle T_SF [msec] at maximum on one way. Since a beacon of another station is not received in this operation mode, a low power consumption operation in hardware is obtained.

A reception activity level relating to the communication station STA1 in the neighbor list of the communication station STA0 is shown in the uppermost tier of FIG. 14 (upper side of FIG. 14A), and this corresponds to item (A)(2) in the neighbor list of the communication station STA0 in FIG. 12. A transmission activity level relating to the communication station STA1 in the neighbor list of the communication station STA0 is shown directly under the reception activity level, and this corresponds to item (A)(1) in the neighbor list of the communication station STA0 in FIG. 12.

Further, a reception activity level relating to the communication station STA0 in the neighbor list of the communication station STA1 is shown directly under the reception state of FIG. 14D, and this corresponds to item (A)(2) in the neighbor list of the communication station STA1 in FIG. 12. A transmission activity level relating to the communication station STA0 in the neighbor list of the communication station STA1 is shown in the lowest tier of FIGS. 14A to 14D, this corresponds to item (A)(1) in the neighbor list of the communication station STA1 in FIG. 12. Hereinafter, an explanation is made also on the assumption that a similar relation of correspondence exists. Specifically, the content of the neighbor list in FIG. 12 also describes the activity level of each terminal shown in FIG. 14.

In the case where there exists data to be transmitted or to be received during a process of transmission and reception processing in the above-described active level 0, a transition is made to the active level 1.

Operation at the Time of Active Level 1

FIGS. 15A to 15D are diagrams showing a transmission and reception procedure in a case of the active level 1. The active level 1 is a state in which a beacon of a neighboring station is received in addition to the operation of the active level 0, and power consumption fluctuates according to the number of neighboring stations. In the active level 1, activities described below are performed.

Beacon transmission operation in each super frame cycle (T_SF)

Reception processing operation during a listen window after beacon transmission

Reception processing operation of beacons from neighboring stations recognized by the relevant station Scan operation performed over super frame cycle (T_SF) at each T_SCAN FIG. 15A is a state of reception operation in the communication station STA0, FIG. 15B is a state of transmission and reception of a packet in the communication station STA0, FIG. 15C is a state of transmission and reception of a packet in the communication station STA1, and FIG. 15D is a state of reception operation in the communication station STA1. Further, a reception (Rx) activity level and a transmission (Tx) activity level in the communication station STA/D are shown on the upper side of FIG. 15A, and a reception (Rx) activity level and a transmission (Tx) activity level in the communication station STA1 are shown on the lower side of FIG. 15D. In FIGS. 15A to 15D, a case where a transition from the active level 0 to the active level 1 is made in accordance with a transmission request from the communication station STA0 and after that the state returns to the active level 0 is referred to as an example.

Initially, the activity level of transmission and reception is 0 in both the communication stations STA0 and STA1; when data D0 to be transmitted to the communication station STA1 is generated in the communication station STA0, a reception activity level of the communication station STA0 with respect to the communication station STA1 makes the transition to the level 1 at that time and a beacon of the communication station STA1 is received at the beacon (B1-3) transmission time of the communication station STA1. When paging information that there is a transmission request to the communication station STA1 is transmitted by making this beacon reception a trigger, the communication station STA1 recognizes that "the STA0 has information to be transmitted to the address thereof", and the activity level of both the transmission and reception relating to the communication station STA0 is changed to the level 1. Further, the communication station STA1 returns an ACK indicating that the above-described paging information is acknowledged to the communication station STA0, and the communication station STA0 having received this ACK changes the transmission activity level relating to the communication station STA1 to the level 1.

After that, at the beacon transmission time of the communication station STA0, the communication station STA0 calls up the communication station STA1 by a beacon (B0-4) after confirming that the transmission activity level relating to the communication station STA1 is the level 1 in the neighbor list. Since the reception activity level relating to the communication station STA0 is the level 1, the communication station STA1 receives this beacon and returns an ACK responding to this call. This call and response assumes a roll corresponding to a RTS and CTS in a RTS/CTS procedure, and after that the data D0 is transmitted in order to transmit from the communication station STA0 to the communication station STA1. Then, the communication station STA1 returns an ACK.

Although both the communication stations STA0 and STA1 operate the reception units over the listen window (LW) after that, the reception units are stopped afterwards due to a reason that there exists no reception data.

In the active level 1, basically with beacon transmission on the data transmission side as the start, transmission and reception of data is performed according to the above-described procedure. Here, when transmission data is small, the communication station STA0 can also transmit the data immediately after the beacon (B1-3) transmitted by the communication station STA1.

Further, hereupon the example in which there exist two stations of STA0 and STA1 is explained, however, in the case where further more stations exist in the neighborhood, there is also a case that a station in which a transmission activity level with respect to any one of stations becomes the level 1 (that is, a station which transmits data to any one of stations) performs beacon reception of a station in which transmission and reception activity levels are set to the level 0.

In the example of FIG. 15, a process of making the transition to the active level 0 after that is shown. After the previous data D0 is transmitted and received, the communication station STA1 transmits a beacon (B1-5) at the beacon transmission timing thereof. Though the communication station STA0 receives this beacon, nothing happens. Further after that, the communication station STA0 transmits a beacon (B0-6) at the beacon transmission timing thereof. Although the communication station STA1 receives this beacon, nothing is transmitted thereto. Then, the communication station STA1 decides to change the activity level relating to the communication station STA0 to the level 0. After that, the communication station STA1 notifies that "the STA1 changes the reception activity level relating to the STA0 to the level 0" in a beacon (B1-7) to be transmitted at the beacon transmission timing thereof or data (not shown in the figure) to be transmitted immediately thereafter, and the activity level is changed to the level 0 as notified. The communication station STA0 having received this notice changes the transmission activity level relating to the communication station STA1 to the level 0. Further after that, the communication station STA0 notifies that "the STA0 changes the reception activity level relating to the STA1 to the level 0" in a beacon (B0-8) to be transmitted at the beacon transmission timing thereof, and changes the activity level to the level 0.

Although the communication station STA1 has changed the activity level to the level 0 on the ground that data is not transmitted following the beacon (B0-6) in the above-described example, there is also a case where the activity level is changed on the ground that data is not transmitted though a plurality of beacons are received successively.

Further, it is also possible to have a timer monitoring time when no transmission and reception of traffic is performed and the activity level is lowered by making the expiration of the timer as a trigger. At this time, it is necessary to set separately a timer to lower a Tx. Active Level and a timer to lower a Rx. Active Level, and a margin is given by setting the time set to the timer of lowering the Tx. Active Level shorter than the timer of lowering the Rx. Active Level and it is possible to prevent from being generated such useless traffic that "a receiving device has not received data though transmitted".

In addition, although the procedure of notifying that the activity level is lowered is performed in the above-described example, there is also a case where this procedure is omitted. In this case, processing is performed such that the STA1 on the reception side automatically changes the activity level when data is not received from the STA0 over N beacon cycles, and the STA0 on the transmission side automatically changes the activity level when an ACK (acknowledgement) of data is not received from the STA1 over an N−1 beacon cycles. Useless processing can be omitted by making the beacon cycle on the transmission side set short.

Other than the above, there is also a case where the activity level is changed to the level 0 on the ground that "transmission and reception of data is only performed dispersively exceeding a permissible value".

Further, although the communication station STA1 that is the reception side decides that "the activity level is changed from the level 1 to the level 0" in the example described above, there is also a case where the communication station STA0 that is the transmission side makes such a decision and the reception side follows the decision. Since a procedure in this case is similar to the procedure explained above, an explanation thereof is not specifically made here.

In the active level 1, Latency required for data transmission and reception is the super frame cycle T_SF [msec] at maximum on one way. The active level 1 is assumed to be such a state that signaling is occasionally exchanged but traffic does not actually performed.

When it is recognized that data to be transmitted or to be received exists regularly during the process of transmission and reception processing in the active level 1, a transition is made to the active level 2. A judgment whether the data to be transmitted or to be received exists regularly is made by monitoring if the number of packets accumulated in the transmission buffer exceeds a predetermined threshold value, for example.

Transition from Active Level 1 to Active Level 2

The active level 2 is a state in which a transmission and reception device is operated periodically in addition to the operation of the active level 1, and is a mode to perform the low power consumption operation by the intermittent transmission and reception though data is transmitted and received.

The following activities are performed in the active level 2.

Beacon transmission operation in each super frame cycle T_SF

Reception processing operation during a listen window after beacon transmission

Reception processing operation of beacons of neighboring stations recognized by the relevant station Reception processing operation (transmission processing operation is also performed according to necessity) at the time specified (or to be specified)

Scan operation performed over a super frame cycle T_SF at each T_SCAN

Figures 16A, 16B, 16C, 16D:
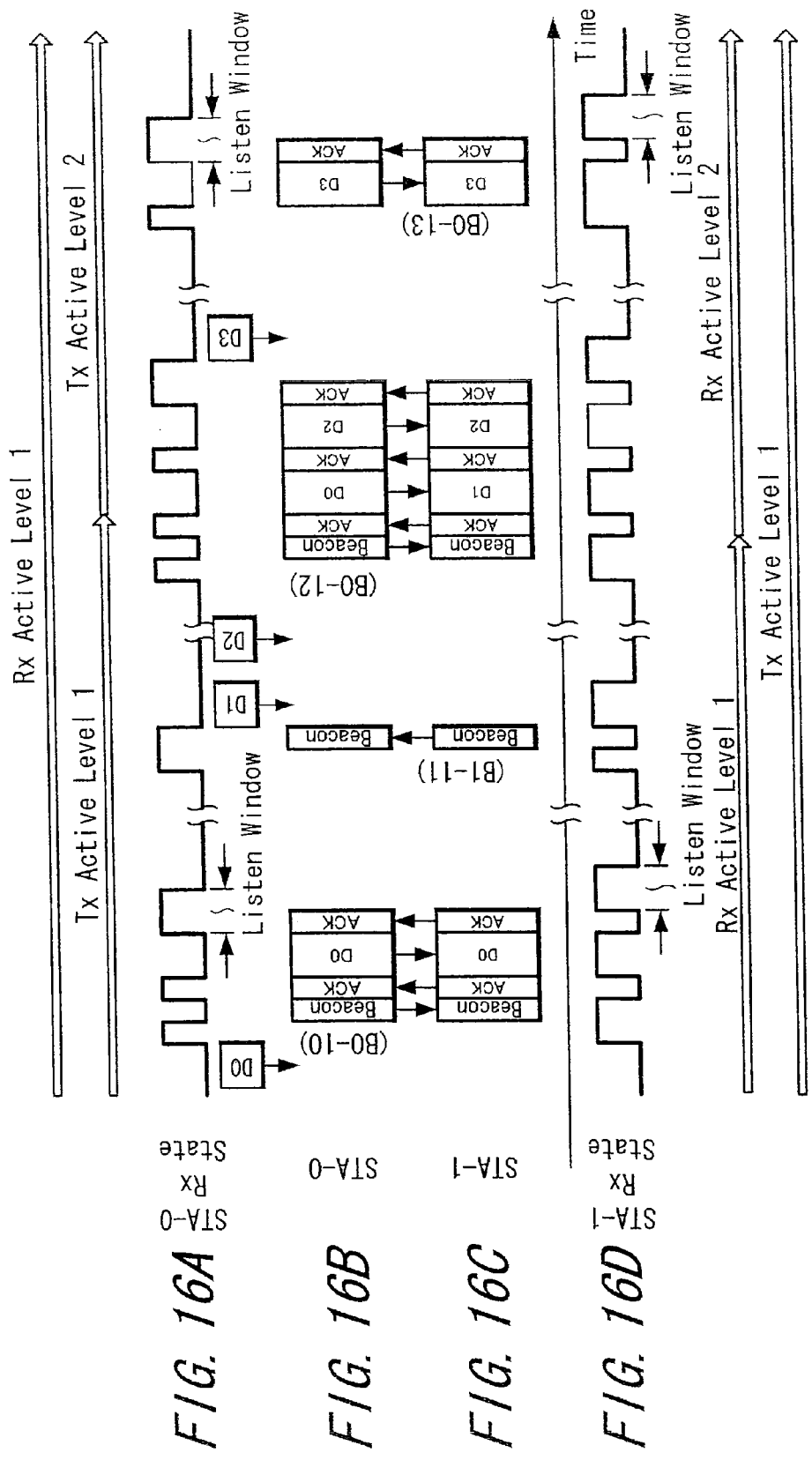
FIGS. 16A to 16D are timing charts showing an example of a transition procedure to the active level 2 according to an embodiment of the present invention.

FIGS. 16A to 16D are diagrams showing a transition from the active level 1 to the active level 2. FIG. 16A is a state of reception operation in the communication station STA0, FIG. 16B is a state of transmission and reception of a packet in the communication station STA0, FIG. 16C is a state of transmission and reception of a packet in the communication station STA1, and FIG. 16D is a state of reception operation in the communication station STA1. Further, a reception (Rx) activity level and a transmission (Tx) activity level in the communication station STA0 are shown on the upper side of FIG. 16A, and a reception (Rx) activity level and a transmission (Tx) activity level in the communication station STA1 is shown on the lower side of FIG. 16D. In FIG. 16, a case where the transition is made in accordance with a transmission request from the communication station STA0 is referred to as an example.

In an initial state of FIG. 16, the transmission and reception of data is performed in a state where both the communication stations STA0 and STA1 are in the level 1 with respect to the transmission and reception levels relating to each other, and the transmission data D0 to the communication station STA1 which has reached the communication station STA0 is transmitted with transmission of a beacon (B0-10) of the communication station STA0 as the start. After that, transmission data D1 and D2 to the communication station STA1 reach the communication station STA0 before again the time becomes the beacon transmission timing of the communication station STA0. At this time, the communication station STA0 judges that the transmission data addressed to the communication station STA1 is accumulated in excess of a permissible value, and decides to change the transmission activity level to the level 2.

When a beacon (B0-12) is transmitted at the beacon transmission timing of the communication station STA0, the communication station STA0 notifies that the STA0 wishes to change the activity level to the level 2 while calling up the communication station STA1 by the beacon. The communication station STA1 having received this notice changes the reception activity level relating to the communication station STA0 to the level 2 as notified, and returns an ACK of acknowledgement. The communication station STA0 having received this acknowledgement confirms that the reception activity level of the communication station STA1 is changed to the level 2, and changes the transmission activity level to the level 2. Further, although both the communication station STA0 and the communication station STA1 operate the reception units only during the listen window (LW) after the transmission data D1 and D2 previously accumulated are transmitted with the beacon (B0-12) as the start and a response thereof is obtained, the reception units are stopped since data is not received any further. After that, since the communication station STA0 is in the state of the transmission activity level 2, the transmission and reception device is operated at the time specified by the transmission active level 2 of the communication station STA0, and transmission of data D3 accumulated during this period is tried after executing a predetermined procedure. On the other hand, the communication station STA1 is in a state synchronized with the active level 2 of the communication station STA0, operates the receiving device similarly at the time specified by the transmission active level 2 of the communication station STA0, receives the transmitted data D3, and returns an ACK.

Further, the communication station STA0 that is the transmission side decides to make the transition of the activity level to the level 2 due to a reason that "it is judged that the transmission data addressed to the communication station STA1 has accumulated in excess of the permissible value" in the above-described example, however other than this, there are a case caused by a reason that "supposing that transmission of data is started immediately after the beacon transmission thereof, it is judged that the transmission of data may not be completed within a certain period of time", a case caused by a reason that "a response from a reception station is not received to the calling made within a category of the active level 1", and the like.

Operation at the time of Active Level 2

FIGS. 17A to 17E are diagrams showing a transmission and reception procedure in a case of the active level 2. FIG. 17A is a state of reception operation in the communication station STA0, FIG. 17B shows a state in which a transmission trigger signal is generated in the communication station STA0, FIG. 17C is a state of transmission and reception of a packet in the communication station STA0, FIG. 17D is a state of transmission and reception of a packet in the communication station STA1, and FIG. 17E is a state of reception operation in the communication station STA1. Further, a reception (Rx) activity level and a transmission (Tx) activity level in the communication station STA0 are shown in the upper side of FIG. 17A, and a reception (Rx) activity level and a transmission (Tx) activity level in the communication station STA1 are shown in the lower side of FIG. 17E. In FIGS. 17A to 17E, a case where data is transmitted from the communication station STA0 to the communication station STA1 is shown as an example, referring to a case where a transmission trigger generated between beacons is generated twice.

In the active level 2, the transmission trigger is generated at the time defined by the relative time from beacon transmission timing on the transmission side, and transmission of data is performed with the generation of this transmission trigger as the start in addition to the transmission of a beacon. First, an explanation is made to the procedure of data transmission and reception which is performed at the time of the active level 2, and it is described later on when the transmission trigger is generated.

In an initial state of FIG. 17, it is assumed that the activity levels of both transmission and reception sides have already become the level 2. The communication station STA0 that is a transmission station transmits D4 and D5 which are transmission data accumulated until then, by making transmission of a beacon (B0-14) a trigger. Since there is no more accumulated transmission data at a point of time when the transmission of D5 is completed, the transmission is once suspended and the reception units are stopped after both the communication stations ATA0 and STA1 make the reception units operated for the period of the listen window (LW). Hereupon, when new transmission data is provided during the period of this listen window (LW), the data is immediately transmitted, though not shown in the figure.

After that, although transmission data D6 is newly supplied to the communication station STA0, the communication station STA0 retains the data since the transmission and reception has been suspended. During this period, both the communication station STA0 and the communication station STA1 monitor an elapsed time from the transmission time of the previous beacon (B0-14) of the communication station STA0 using timers provided therein, and a transmission trigger is generated after a predetermined time T-AL2(1) [.mu.sec] elapses. The communication station STA0 tries to transmit accumulated data addressed to the communication station STA1 with the generation of this transmission trigger as the start. On the other hand, similarly the communication station STA1 also operates the receiving device when the time T-ALT2(1) [.mu.sec] elapses from the transmission time of the previous beacon (B0-14) to be ready for transmission from the communication station STA0.

Accordingly, data D6 and D7 which are accumulated in the communication station STA0 are transmitted and received with this transmission trigger as the start. After the transmission and reception of the data D7 is completed, the communication station STA0 and the communication station STA1 suspend the transmission, because there is no more accumulated transmission data, and both the communication stations STA0 and STA1 stop the reception units after the reception units are operated during the period of the listen window (LW). After that, although new data D8 is supplied to the communication station STA0, the communication station STA0 retains this data, because the transmission and reception has been suspended. Even during this period, both the communication station STA0 and STA1 monitor an elapsed time from the transmission time of the previous beacon (B0-14) of the communication station STA0 using the timers provided therein, and a new transmission trigger is generated when a predetermined time T-AL2(2) [.mu.sec] elapses from the previously generated transmission trigger. The communication station STA0 and the communication station STA1 again perform transmission and reception of data according to the above-described procedure with the generation of this transmission trigger as the start.

Then, similar processing is repeated until a next transmission beacon (B0-16) of the communication station STA0 is generated.

Example of Setting T-AL2(i) at Active Level 2

A purpose to define the active level 2 is to reduce power consumption by supplementing the T_SF that is the beacon interval and by using the intermittent operation at the same time while providing shorter latency but allowing some latency. Further, it is desirable that the time of generating this transmission trigger does not mutually overlap with other communication stations in order to avoid a collision with a transmission packet of another station and to improve the performance at the MAC level.

Particularly, when the number of communication stations accommodated in a network is small, a transmission station generates in the active level 2 a transmission trigger such that a transmission operation can be started at each T-AL2(i), based on the reference time that determines the beacon transmission time thereof or based on the beacon transmission time such as the TBTT, in consideration of satisfying the above-described matters as much as possible. The T-AL2(i) (i=1, 2, - - - ) is obtained by the following formula.T.sub.—AL2.sub.—i=(N AL2 STEP+AL2 TBL[i])*T Bmin+N AL2 TRX STT OFFSET+N AL2 TRX STT OFFSET STEP*i, whereinAL2 TBL[i]=[0, −1, 0, 0, 0, 1]

For example, when the above-described operation is performed at T_SF=40 msec, T Bmin=625 [.mu.sec], N AL2 STEP=9, N AL2 TRX STT OFFSET=180 [.mu.sec], and N AL2 TRX STT OFFSET STEP=10.0 [.mu.sec], each transmission trigger time T AL 2[i] is set to:
T AL2[0]=TBTT
T AL2[1]=TBTT+5.625 [msec]+190 [.mu.sec]
T AL2[2]=TBTT+10.625[msec]+200[.mu.sec]
T AL2[3]=TBTT+16.250[msec]+210[.mu.sec]
T AL2[4]=TBTT+21.875[msec]+220[.mu.sec]
T AL2[5]=TBTT+27.500[msec]+230[.mu.sec]
T AL2[6]=TBTT+33.750[msec]+240[.mu.sec]
and the time at which transmission is possible appears at intervals of approximately 6.25[msec].

For example, when bulk transfer of an FTP and the like is performed through a TCP of MAX WIN SIZE=64 kByte, latency of both ways becomes 12.5 [msec] at the worst value, and a limit of throughput resulted from flow control of the TCP becomes 40.96 [Mbps]. If a processing delay required for transmission and reception is estimated at 1.0 [msec], it is possible to provide up to 35.31 [Mbps].

Further, when the setting is the above-described T AL2[*], and in case that the TBTT exists at every T Bmin from 0 to 63, a macroscopic collision of T AL2[*] becomes as follows, when those that collide with a communication station of TBTT=0 are picked up.
TBTT=8, 56.times.one time
TBTT=20, 28, 36, 44.times.one time
TBTT=10, 18, 26, 38, 46, 54.times.two times
TBTT=17, 19, 27, 29, 35, 37, 45, 47.times.two times
TBTT=9, 55.times.four times The collision of the T AL2[*] does not occur when the number of communication stations is 4 or less, the collision with two stations occurs one time each when the number of communication stations is eight or less, and the possibility of collision may increase as the number of communication stations increases more than that. Although a reception station is in a state in which reception and transmission can be performed at a designated T AL2[i], the reception station makes a transition to an idle state again after a receiving device is operated during a period of T LW when no data is transmitted thereto. In addition, when a reception node recognizes that information addressed to the relevant reception node is not transmitted at the designated T AL2[i], a time rate of an active state may be lowered after notifying a communication station of transmission source that reception operation is performed only at the time of any of T AL2(i).

Further, although six sets of transmission trigger time are defined as the active level 2 in the above-described example, the present invention is not limited thereto.

Furthermore, such processing, in which a plurality of stages are defined in the active level 2, three sets of transmission trigger time are generated at an active level 2-1, and six sets of transmission trigger time are generated at an active level 2-2, is also within a range conceivable from the present invention.

Transition from Active Level 2 to Active Level 1

FIGS. 18A to 18E are diagrams showing a transition from the active level 2 to the active level 1. FIG. 18A is a state of reception operation in the communication station STA0, FIG. 18B shows a state in which a transmission trigger signal is generated in the communication station STA0, FIG. 18C is a state of transmission and reception of a packet in the communication station STA0, FIG. 18D is a state of transmission and reception of a packet in the communication station STA1, and FIG. 18E is a state of reception operation in the communication station STA1. Further, a reception (Rx) activity level and a transmission (Tx) activity level in the communication station STA0 are shown on the upper side of FIG. 18A, and a reception (Rx) activity level and a transmission (Tx) activity level in the communication station STA1 are shown on the lower side of FIG. 18E. In FIGS. 18A to 18E, a case where the transition is made in accordance with a request from the communication station STA1 is referred to as an example.

In an initial state in FIGS. 18A to 18E, the transmission and reception of data is performed in a state where both the communication stations STA0 and STA1 are in the level 2 with respect to the transmission and reception levels relating to each other, and the transmission and reception of data is performed from the communication station STA0 to the communication station STA1 with transmission of a beacon of the communication station STA0 or transmission of the generation of a transmission trigger as the start.

In this figure, first the communication station STA0 transmits a beacon (B0-16), and transmission data D10 and D11 which have been accumulated in the communication station STA0 are transmitted and received with this beacon transmission as the start. After that, the reception unit is operated over the period of the listen window (LW), and then the transmission and reception is suspended. After that, the T-AL2(1) [.mu.sec] elapses from the transmission time of the previous beacon (B0-16), and a transmission trigger is generated. Although both the communication stations STA0 and STA1 operate the reception units around this time, no transmission and reception is performed since there is no transmission data accumulated in the communication station STA0, and the reception units are again stopped after the period of the listen window (LW) elapses from the generation of the transmission trigger. Further, the T-AL2(2) [.mu.sec] elapses from the generation of this transmission trigger, a transmission trigger is again generated, the communication stations STA0 and STA1 perform similar operations, but there is no data transmitted and received.

Further after that, although the communication station STA0 transmits a beacon (B0-18), there is also no data transmitted and received. At this point of time, the communication station STA1 decides that the reception activity level relating to the communication station STA0 is changed to the level 1 on the ground that transmission data does not exist over one beacon transmission cycle. After that, the communication station STA1 notifies that "the STA1 changes the transmission and reception activity level relating to the STA0 to the level 1" in a beacon (B1-19) to be transmitted at the beacon transmission timing thereof or in data (not shown in the figure) to be transmitted immediately after that, and changes the activity level to the level 1 as notified. The communication station STA0 having received this notice changes the transmission activity level relating to the communication station STA1 to the level 1.

Although the communication station STA1 changes the activity level to the level 1 on the ground that "data does not exist over one beacon transmission cycle" in the above-described example, there is also a case where the activity level is changed on the ground that "data does not exist over a plurality of cycles".

Further, although the procedure of notifying that the activity level is lowered is performed in the above-described example, there is also a case where this procedure is omitted. In this case, processing is performed such that the STA1 on the reception side automatically changes the activity level when data is not received from the STA0 over N beacon cycles, and the STA0 on the transmission side automatically changes the activity level when an ACK (acknowledgement) of data is not received from the STA1 over N−1 beacon cycles. Useless processing can be omitted by making the beacon cycle on the transmission side set short.

In addition, although the communication station STA1 that is the reception side decides that "the activity level is changed from the level 2 to the level 1" in the above-described example, there is also a case where the communication station STA0 that is the transmission side makes such a decision and the reception side follows this decision. Since a procedure in this case is similar to the procedure explained above, an explanation thereof is not specifically made here.

Transition from Active Level 2 to Active Level 3

The active level 3 is a state in which a reception operation is performed even during an idle period of time in addition to the operation of the active level 1, and a operation of detecting a carrier (or preamble) transmitted by another communication station is consecutively performed. This active level 3 is a mode which provides as wide a band as possible and as short the latency as possible by this active level, though the efficiency of reducing power consumption is small.

The following operations are performed in the active level 3.

Beacon transmission operation in each super frame cycle T_SF

Reception processing operation during a listen window after the beacon transmission Continuous reception processing operation FIGS. 19A to 19E are diagrams showing a transition from the active level 2 to the active level 3. FIG. 19A is a state of reception operation in the communication station STA0, FIG. 19B shows a state in which a transmission trigger signal is generated in the communication station STA0, FIG. 19C is a state of transmission and reception of a packet in the communication station STA0, FIG. 19D is a state of transmission and reception of a packet in the communication station STA1, and FIG. 19E is a state of reception operation in the communication station STA1. Further, a reception (Rx) activity level and a transmission (Tx) activity level in the communication station STA0 is shown on the upper side of FIG. 19A, and a reception (Rx) activity level and a transmission (Tx) activity level in the communication station STA1 is shown on the lower side of FIG. 19E. In FIGS. 19A to 19E, a case where the transition is made in accordance with a transmission request from the communication station STA0 is referred to as an example.

In an initial state of FIGS. 19A to 19E, the transmission and reception of data is performed in a state where both the communication stations STA0 and STA1 are in the level 2 with respect to the transmission and reception levels relating to each other, and the transmission data D8, D9 and D10 to the communication station STA1 which have been accumulated in the communication station STA0 are transmitted with the generation of a transmission trigger as the start. After that, although the reception unit is operated over the listen window (LW), the transmission and reception is suspended, because new transmission data is not generated. However, transmission data D11 and D12 to the communication station STA1 reach the communication station STA0 prior to the time of transmitting a beacon (B0-20) of the communication station STA0 that is a next transmission opportunity. At this time, the transmission station STA0 judges that the transmission data addressed to the communication station STA1 have been accumulated in excess of a permissible value, and decides to change the transmission activity level to the level 3.

When the beacon (B0-20) is transmitted at the beacon transmission timing of the communication station STA0, the communication station STA0 notifies that the STA0 wishes to change the activity level to the level 3 while calling up the communication station STA1 by the beacon. The communication station STA1 having received this notice changes the reception activity level to the level 3 as notified, and returns an ACK of acknowledgement. The communication station STA0 having received this ACK confirms that the reception activity level of the communication station STA1 is changed to the level 3, and changes the transmission activity level relating to the communication station STA1 to the level 3. Further, on and after the transmission data D11 which have been accumulated are transmitted sequentially with the transmission of the beacon (B0-20) as the start, and the communication station STA1 receives the transmitted data sequentially.

In the active level 3, the transmission procedure is started immediately when new transmission data arrives at the transmission side, and delivery of the transmission data as early as possible is attempted. On the other hand, the reception side keeps the reception unit operating, and is prepared for reception of data addressed thereto though it is uncertain when the data is transmitted.

In the above-described example, the communication station STA0 that is the transmission side decides to make the transition of the activity level to the level 2 due to the reason that "it is judged that the transmission data addressed to the STA1 has accumulated in excess of the permissible value", however, other that this, there are also a case caused by a reason that "supposing that the accumulated transmission data is transmitted with the transmission trigger as the start, it is judged that the transmission of data may not be completed within a certain period of time", a case caused by a reason that "a response is not received to the calling of the reception station which is made within a category of the active level 2", and the like.

Transition from Active Level 3 to Active Level 2

FIGS. 20A to 20E are diagrams showing a transition from the active level 3 to the active level 2. FIG. 20A is a state of reception operation in the communication station STA0, FIG. 20B shows a state in which a transmission trigger signal is generated in the communication station STA0, FIG. 20C is a state of transmission and reception of a packet in the communication station STA0, FIG. 20D is a state of transmission and reception of a packet in the communication station STA1, and FIG. 20E is a state of reception operation in the communication station STA1. In addition, a reception (Rx) activity level and a transmission (Tx) activity level in the communication station STA0 is shown on the upper side of FIG. 20A, and a reception (Rx) activity level and a transmission (Tx) activity level in the communication station STA1 is shown on the lower side of FIG. 20E. In this figure, a case where the transition is made in accordance with a request from the communication station STA1 is referred to as an example.

In an initial state of FIGS. 20A to 20E, the transmission and reception of data is performed in a state where both the communication stations STA0 and STA1 are in the level 3 with respect to the transmission and reception levels relating to each other, and the transmission and reception of data is performed immediately when the transmission data is generated in the communication station STA0. However, in FIGS. 20A to 20E, this transmission and reception of data is not performed frequently, transmission and reception of data D19 is performed after some time elapsing from transmission and reception of data D18, and data is not transmitted further for a while. Then, the communication station STA1 decides to change the reception activity level relating to the communication station STA0 to the level 2 on the ground that the transmission and reception of data is only performed dispersively in excess of a permissible value. After that, the communication station STA1 notifies that "the STA1 changes the reception activity level relating to the STA0 to the level 2" in a beacon (B1-21) transmitted at the beacon transmission timing thereof or in data (not shown in the figure) transmitted immediately after that, and changes the activity level to the level 2 as notified. The communication station STA0 having received this notice changes the transmission activity level relating to the communication station STA1 to the level 2.

After the transition is made to the active level 2, a transmission trigger is generated in accordance with the procedure explained above, and transmission and reception of data is performed with the transmission trigger as the start.

Although the communication station STA1 changes the activity level to the level 2 on the ground that "the transmission and reception of data is only performed dispersively in excess of the permissible value" in the above-described example, specifically, there is also a case where the change is made on the ground that "transmission and reception is only performed with respect to the volume of data which even the reception active level 2 is capable of receiving".

In addition, although the procedure of notifying that the activity level is lowered is performed in the above-described example, there is also a case where this procedure is omitted. In this case, useless processing can be omitted by setting the permissible value in the STA1 on the reception side higher than the permissible value in the STA0 on the transmission side.

Further, although the communication station STA1 that is the reception side decides that "the activity level is changed from the level 3 to the level 2" in the above-described example, there is also a case where the communication station STA0 that is the transmission side makes such a decision and the reception side follows this decision. Since a procedure in this case is similar to the procedure explained above, an explanation thereof is not specifically made here.

Network Broadcast

As explained above, the transmission and reception level in each communication station is the level 0 in the state where the transmission and reception of data is not performed, so that power is saved.

On the other hand, when broadcast information to be conveyed to the whole network is transmitted, the transmission is sequentially performed in a form shown, for example, in FIGS. 21A, 21B, and 21C, and each communication station conveys the received broadcast information to neighboring communication stations, so that the information is transmitted to all the communication stations in the network.

When broadcast information is transmitted and received in the transmission and reception level 0, it is necessary to transmit the message a plurality of times aiming at timing immediately after transmission of a beacon of each communication station, which is wasteful. In such a case where the broadcast information is consecutively generated, traffic becomes increased which leads to a waste of band.

Broadcast Transmission and Reception Procedure

Accordingly, when broadcast information is generated, an operation state thereof is made into an ACT-1all, the transmission activity level relating to each communication station is changed while transmitting "a request that the operation state is changed to the ACT-1all" to a neighboring communication station after the reception activity level relating to all the neighboring communication stations is set to the level 1, and the broadcast information is informed within a transmission beacon thereof or in a packet transmitted immediately after the transmission of beacon until the transmission activity level registered in the neighbor list becomes the level 1. Further, the operation state thereof is written in the transmission beacon and in the above-described request information.

Figures 22A, 22B, 22C:
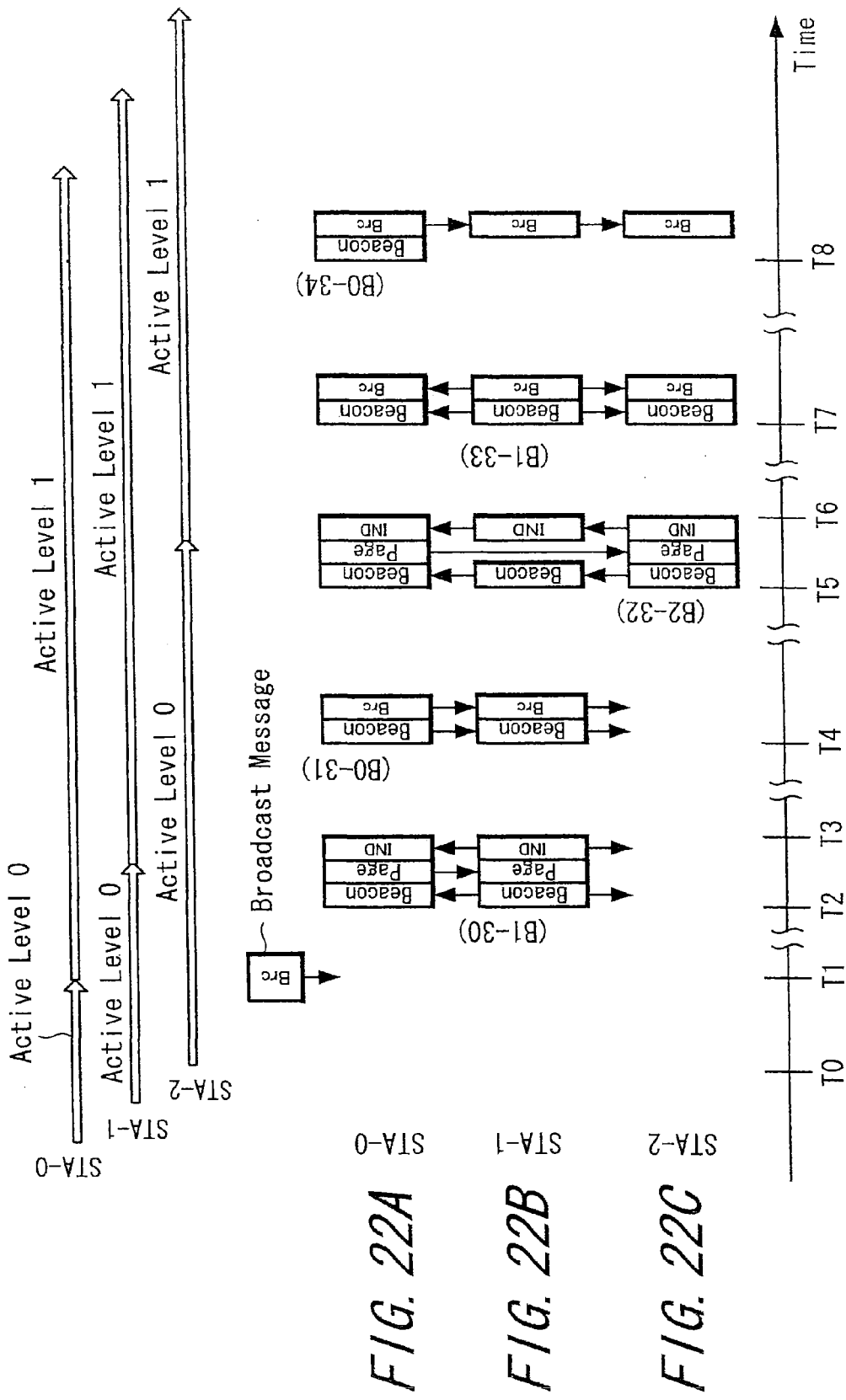
FIGS. 22A to 22C are explanatory diagrams showing an example of a transmission and reception procedure of a broadcast signal according to an embodiment of the present invention.

A specific example is shown in chronological order in FIGS. 22A to 22C. FIGS. 22A to 22C are diagrams showing an example of a transmission and reception procedure of broadcast information, and a case where the communication station STA0 conveys the broadcast information to the communication station STA1 and the communication station STA2 in such an arrangement of communication stations as shown in FIGS. 21A to 21C, for example, is referred to as an example. FIG. 22A is a state of transmission and reception of a packet in the communication station STA0, FIG. 22B is a state of transmission and reception of a packet in the communication station STA1, and FIG. 22C is a state of transmission and reception of a packet in the communication station STA2. In addition, an activity level of each of communication stations STA0, STA1, and STA2 is shown on the upper side of FIG. 22A.

FIG. 23 shows an operation state of each communication station and a state of the neighbor list in the example of each time in the chronological order in FIGS. 22A to 22C.

Each communication station is in the active level 0 at the time T0 that is an initial state of FIGS. 22A to 22C, and only transmission of a beacon thereof and reception processing immediately after that over the listen window (LT) are performed. At this time, all items in the neighbor list of each station are in the active level 0 (ACT-0) as shown in FIG. 23.

After that, broadcast information to be transmitted to the communication station STA0 arrives at the time T1. With this information as the start, the communication station STA0 sets the operation state thereof to the ACT-1all, and sets the reception activity levels relating to all communication stations existing in the neighbor list to the level 1. At this point of time, the communication station STA0 has shifted into a mode to receive a beacon of each communication station.

After that, the communication station STA0 transmits page information addressed to the communication station STA1 indicating that "it is desired that the operation state is changed to the ACT-1all" after receiving a beacon transmitted by the communication station STA1 at the beacon transmission time T2 of the communication station STA1. The communication station STA1 acknowledges this request, and transmits indication information indicating that "the operation state has been changed to the ACT-1all" at the time T3 as notified information (that is, the destination address is made to a broadcast address). At this point of time, the communication station STA1 sets the operation state to the ACT-1all, sets the reception activity levels relating to all communication stations existing in the neighbor list to the level 1, and also sets the transmission activity level to the communication station STA0 that is a transmission source of the page information to the level 1. Further, the transmission activity level relating to the communication station STA1 is set to the level 1 in the communication station STA0 having received the above-described indication information transmitted by the communication station STA1.

After that, it becomes the beacon transmission time of the communication station STA0 at the time T4. In the beacon, it is written that the operation state of the communication station STA0 is set to the ACT-1all. At this time, since the transmission activity level relating to the communication station STA1 has been already set to the level 1, the communication station STA0 recognizes that the communication station STA1 performs reception, and transmits the broadcast information. This broadcast information is received by the communication station STA1. However, the communication station STA0 recognizes that the broadcast information is not distributed to the communication station STA2, because the transmission activity level relating to the communication station STA2 registered in the neighbor list thereof is the level 0. Note that there is also a case where the communication station STA0 does not transmit the broadcast information until the transmission activity levels relating to all communication stations registered in the neighbor list thereof become the level 1 or higher.

Further after that, the communication stations STA1 and STA0 transmit page information addressed to the communication station STA2 indicating that "it is desired that the operation state is changed to the ACT-1all" after receiving a beacon transmitted by the communication station STA2 at the time T5. In this figure, a case where the communication station STA0 transmits the page information is shown as an example. The communication station STA2 acknowledges this request, and transmits indication information indicating that "the operation state has been changed to the ACT-1all" at the time T6 as notified information in a similar procedure to the one described above. At this point of time, the communication station STA2 sets the operation state to the ACT-1all, sets the reception activity levels relating to all communication stations existing in the neighbor list to the level 1, and also sets the transmission activity level to the communication station STA0 that is the transmission source of the page information to the level 1. In addition, the communication stations STA0 and STA1 having received the above-described indication information transmitted by the communication station STA2 set the transmission activity level relating to the communication station STA2 to the level 1.

After that, the communication station STA1 transmits a beacon at the time T7. In the beacon, it is written that the operation state of the communication station STA1 has been set to the ACT-1all. At this time, in case that the broadcast information has been previously received from the communication station STA0, the communication station STA1 transmits the broadcast information. At this point of time, the broadcast information has been transmitted to the communication stations STA1 and STA2. On the other hand, the communication station STA2 recognizes that the operation state of the communication station STA1 has been set to the ACT-1all by receiving the beacon of the communication station STA1, and changes the transmission activity level relating to the communication station STA1 to the level 1.

After that, the communication station STA0 transmits a beacon at the time T8, and also transmits the broadcast information, because the transmission activity levels relating to all neighboring stations in the communication station STA0 are the level 1 at this point of time.

In such procedure as described above, each communication station can mutually change an operation state of a neighboring communication station to the ACT-1all. There is also a case where the changed operation state is returned to the ACT-0 on the ground that reception data and the like do not exist over a certain period of time.

Information Written in Beacon

Explanation of writing an operation state in a beacon is made above; further details are explained with respect to information written in a beacon.

Figure 24:
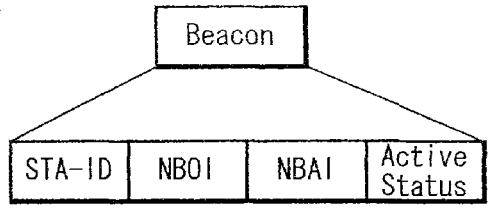
FIG. 24 is an explanatory diagram showing part of information written in a beacon signal according to an embodiment of the present invention.

FIG. 24 is a diagram showing an example of a part of information written in a beacon in the present system. In the beacon, there exist at least an address of transmission station (STA-ID), a field showing the reception time of a receivable beacon (NBOI), a field showing the reception time of a beacon to which reception is actually performed in the reception active level 1 or higher (NBAI), and a field showing an operation state of this communication station (Activity Status).

The address identifying the transmission station is written in the STA-ID. The field showing the operation state of the communication station (Activity Status) is the field showing the operation state explained above, and any one of the following operation states is shown.

ACT-0all: One or more neighboring stations whose reception activity levels are the level 0 exist.

ACT-1all: Reception activity levels of all the neighboring stations are the level 1 or higher.

ACT-3all: Activity levels relating to one or more neighboring stations are the level 3.

Activity Level Change Request Message

Although the explanation is made above with respect to the embodiment in which the communication station informs the communication partner station of the decision of making the transition of the activity level thereof by a beacon signal, a procedure of changing an activity level in which transmission of a message other than a beacon signal is employed as a trigger is explained next.

Figure 25:
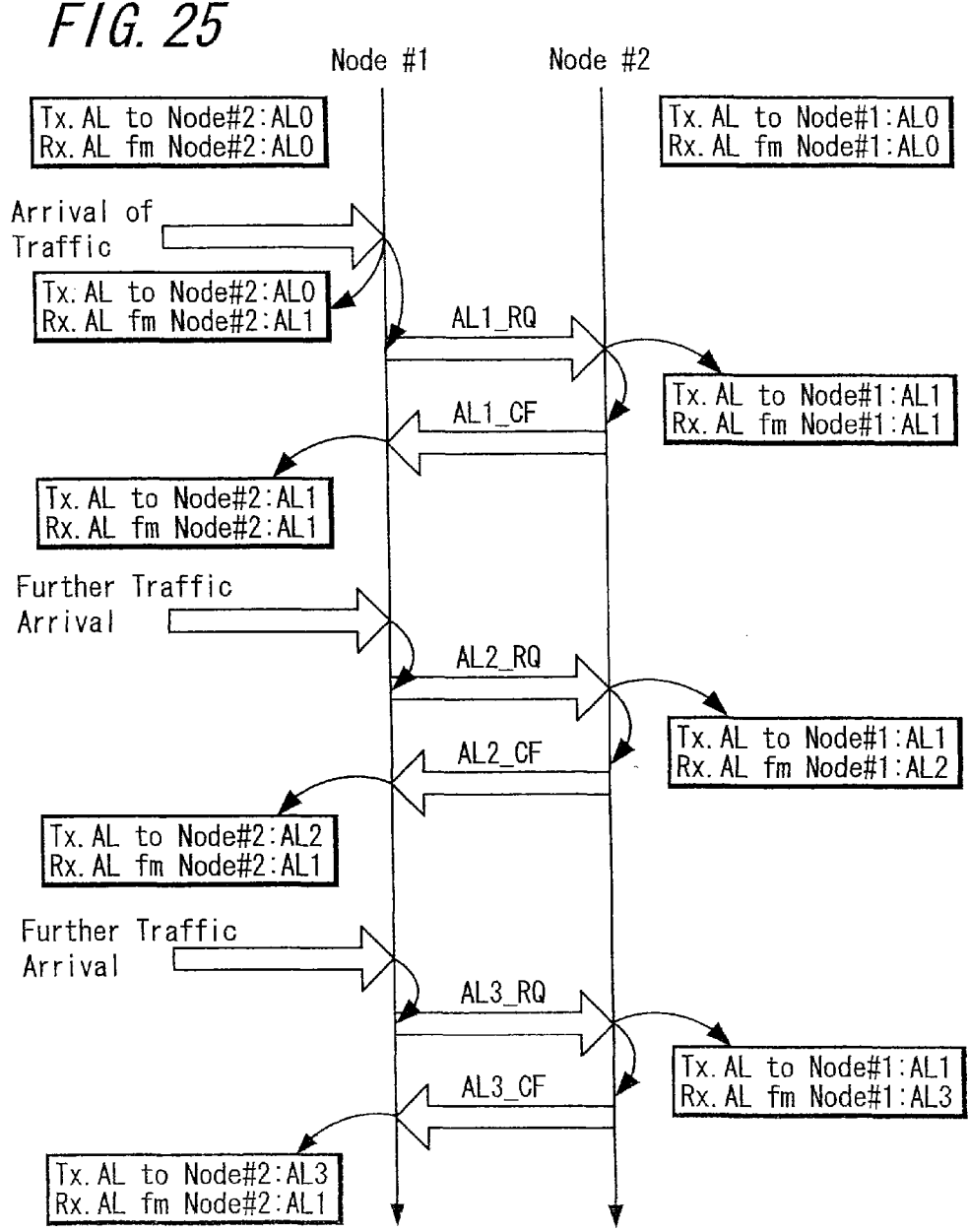
FIG. 25 is an explanatory diagram showing transaction of active level upload according to an embodiment of the present invention.

A procedure in a case where a transition is made in a direction of raising the activity level is shown in FIG. 25.

Although the activity level is the level 0 in a state where traffic does not exist, processing of raising an Activity of a link is started when traffic addressed to another communication station is delivered to a MAC layer of a certain communication station. After that, the activity level is raised as further traffic is delivered to the MAC layer on the transmission side.

In FIG. 25, a case where a node #1 is a transmission source node of the traffic and a node #2 is a destination node is referred to as an example. As shown in this figure, an increase in the activity level is started by a trigger that is an instruction given from the transmission source. In the case where the transmission side wants the destination node to raise the activity level, a request message of "AL*_RQ" is transmitted after confirming that a Rx. active level from this node is the level 1 or higher and notifies that the transmission side wants the destination node to raise the activity level. When this request message is received, the reception side sets a Rx. active level relating to the transmission source node to the designated level, and returns a response message of "AL*_CF" after further confirming that a Tx. active level is the level 1 or higher and notifies the transmission source node that the active level has been raised. When this response message is received, the transmission side sets the transmission active level relating to the destination node to the designated level.

As shown in this figure, a similar procedure can be applied to the transition in an upward direction to all the active levels.

The trigger to the transition to Active Level_0.fwdarw.Active Level_1 is the generation of transmission data.

The trigger to the transition after that: Active Level_1.fwdarw.Active Level_2.fwdarw.Active Level_3 may be started when the number of packets exceeds a predetermined threshold value by monitoring the number of packets accumulated in the transmission buffer, for example.

Figure 26:
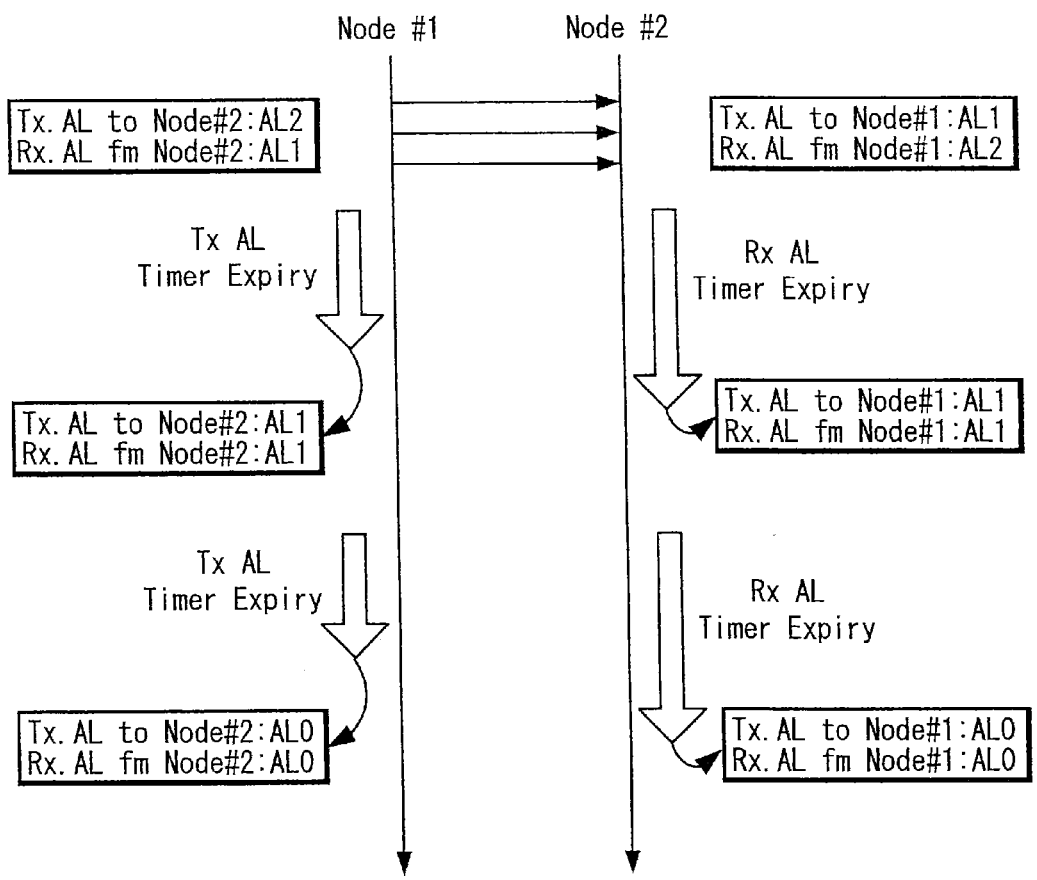
FIG. 26 is an explanatory diagram showing transaction of active level download according to an embodiment of the present invention.
Figures 27A, 27B, 27C:
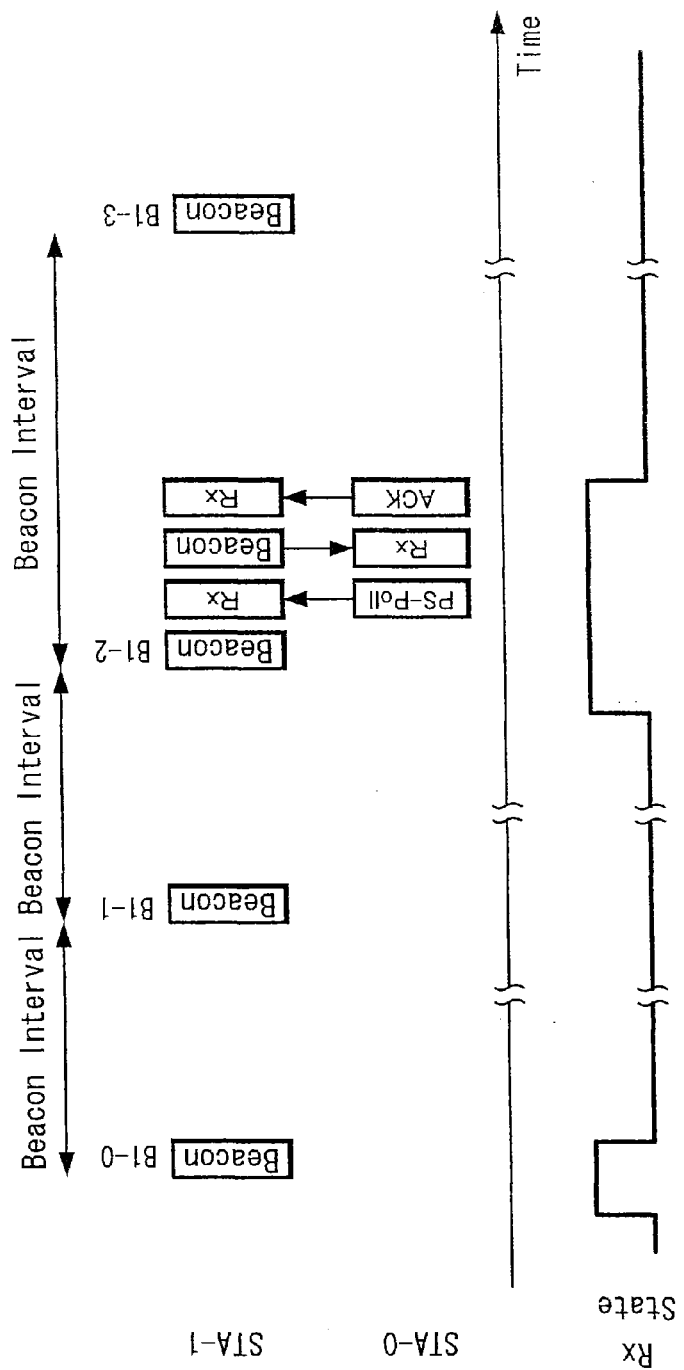
FIGS. 27A to 27C are timing charts showing an example of a transmission and reception state in an infrastructure mode of a wireless communication system in related art.
Figures 28A, 28B, 28C:
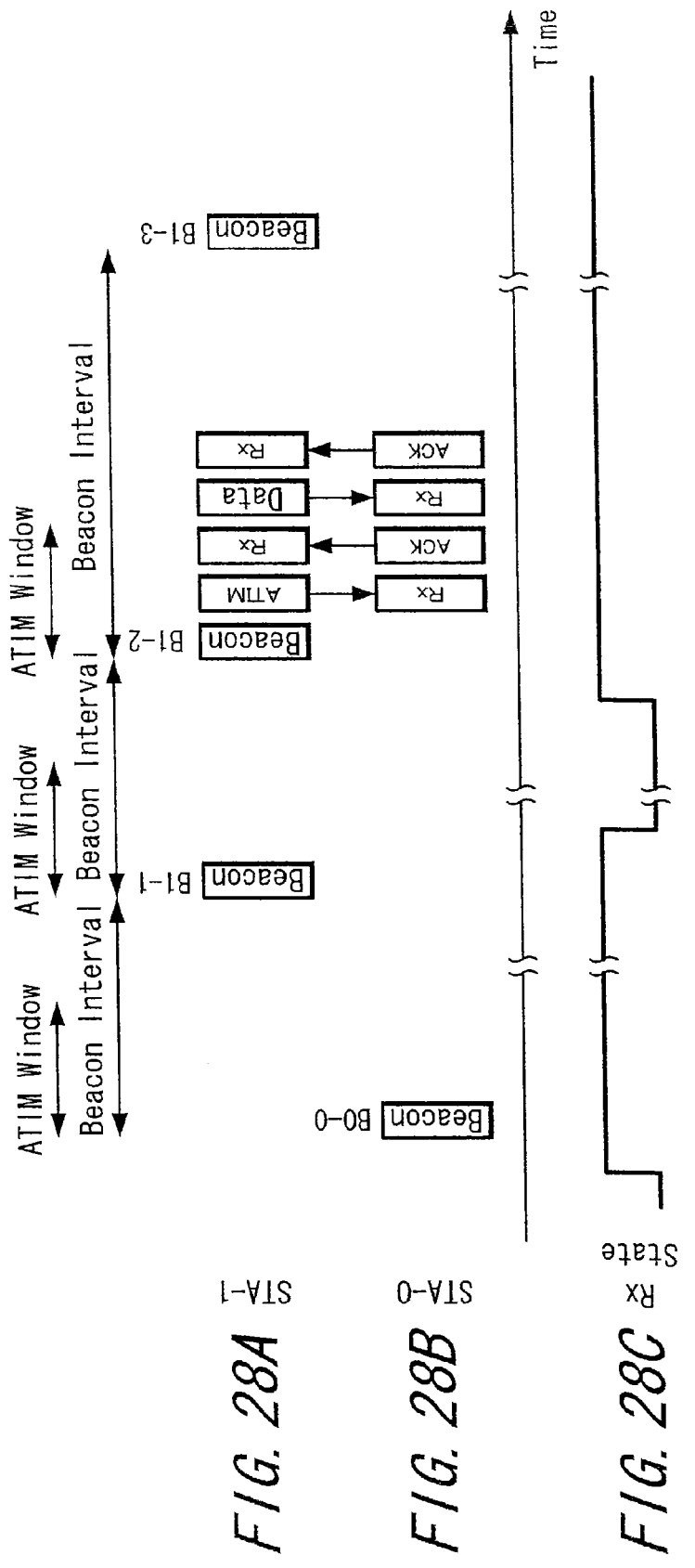
FIGS. 28A to 28C are timing charts showing an example of a transmission and reception state in an ad hoc mode of a wireless communication system in related art.

Next, a procedure in a case where the transition is made in a direction of lowering the activity level is explained using FIG. 26.

Processing for lowering the activity level becomes necessary when transmission and reception of the traffic is discontinued though the activity level is raised. A timer is kept running to monitor time during which there is no transmission and reception of the traffic, and the active level is lowered by making the expiration of the timer as a trigger. At this time, it is necessary to set separately a timer to lower the Tx. active level and a timer to lower the Rx. active level, a margin is given by setting a time that is set to the timer to lower the Tx active level shorter than the timer to lower the Rx. active level, and the generation of such useless traffic that "a receiving device has not received, though transmission is performed" can be prevented.

Further, as the processing at the time of lowering the active level, it is also conceivable to follow a procedure through exchanging messages similarly to the case of raising the active level. Even in this case, a mechanism to lower the active level using the timer is required in order to cope with the link in which the communication is suddenly discontinued.

It should be noted that an example of a configuration of a communication apparatus which exclusively performs transmission and reception is explained in the above described embodiment, however, it is also possible that a board, a card, and the like to perform communication processing equivalent to the transmission unit and the reception unit of this embodiment are mounted on a personal computer apparatus performing various data processing, for example, and software is installed to execute processing in a base-band unit by a central processing unit on the computer apparatus side.

What is claimed is:

1. An electronic device forming a part of a communication system comprising:
   first processing circuitry configured to:
   receive a beacon from a counterpart device forming a part of the communication system after a beacon transmitting timing;
   wherein the communication system includes second processing circuitry configured to cause the counterpart device to:
   set a transmitting and receiving operation as active state for a first operating period, the first operating period being a designated time period starting at the beacon transmitting timing,
   set a transmitting and receiving operation as operation state for a second operating period, the second operating period is from a beacon transmitting timing to a next beacon transmitting timing, and
   set a transmitting and receiving operation as operation state for a third operating period, the third operating period is scheduled in advance; and
   wherein a start time, duration, and interval of the third operating period is included in a beacon signal transmitted from the counterpart device to the electronic device.

2. The electronic device of claim 1, the first processing circuitry further configured to control transmitting to and receiving from the counterpart device according to ad-hoc communication.

3. The electronic device of claim 1, the communication system causing the counterpart device to set a transmitting and receiving operation as active state after the first operating period elapses by transmitting a signal to the counterpart device.

4. The electronic device of claim 1, wherein the first operating period is shorter than a beacon interval.

5. The electronic device of claim 1, further comprising:
   an antenna unit configured to transmit or receive signals.

6. The electronic device of claim 1, further comprising:
   an interface unit configured to exchange information sets with an external device.

7. The electronic device of claim 1, further comprising:
   a transceiver configured to communicate with a counterpart communication apparatus.

8. The electronic device of claim 1, wherein the counterpart device determines a duration of the first operating period.

9. A communication method performed in an electronic device forming part of a communication system, the communication method comprising:
   receiving a beacon from a counterpart device forming a part of the communication system after a beacon transmitting timing;
   wherein the communication system causes the counterpart device to:
   set a transmitting and receiving operation as active state for a first operating period, the first operating period being a designated time period starting at the beacon transmitting timing, and
   set a transmitting and receiving operation as operation state for a second operating period, the second operating period is from a beacon transmitting timing to a next beacon transmitting timing,
   set a transmitting and receiving operation as operation state for a third operating period, the third operating period is scheduled in advance; and
   wherein a start time, duration, and interval of the third operating period is included in a beacon signal transmitted from the counterpart device to the electronic device.

10. The communication method of claim 9, further comprising controlling transmitting to and receiving from the counterpart device according to ad-hoc communication.

11. The communication method of claim 9, the communication system causing the counterpart device to set a transmitting and receiving operation as active state after the first operating period elapses by transmitting a signal to the counterpart device.

12. The communication method of claim 9, wherein the first operating period is shorter than a beacon interval.

13. The communication method of claim 9, further comprising using an antenna unit to transmit or receive signals.

14. The communication method of claim 9, further comprising using an interface unit to exchange information sets with an external device.

15. The communication method of claim 9, wherein the counterpart device determines a duration of the first operating period.

16. A communication apparatus forming a part of a communication system, the communication apparatus comprising:
   a transceiver configured to communicate with a counterpart communication apparatus; and
   first processing circuitry configured to:
      receive a beacon from a counterpart device forming a part of the communication system after a beacon transmitting timing;
   wherein the communication system includes second processing circuitry configured to cause the counterpart device to:
      set a transmitting and receiving operation as active state for a first operating period, the first operating period being a designated time period starting at the beacon transmitting timing,
      set a transmitting and receiving operation as operation state for a second operating period, the second operating period is from a beacon transmitting timing to a next beacon transmitting timing, and
      set a transmitting and receiving operation as operation state for a third operating period, the third operating period is scheduled in advance,
   wherein a start time, duration, and interval of the third operating period is included in a beacon signal transmitted from the counterpart device to the electronic device.

17. The communication apparatus of claim 16, the first processing circuitry further configured to control transmitting to and receiving from a counterpart device according to ad-hoc communication.

18. The communication apparatus of claim 16, the second processing circuitry further configured to cause the counterpart device to keep the transmitting and receiving operation as active state according to reception of a signal from a counterpart device even after the first operating period elapses.

19. The communication apparatus of claim 16, wherein the first operating period is shorter than a beacon interval.

20. The communication apparatus of claim 16, the second processing circuitry further configured to cause the counterpart device to set the transmitting and receiving operation as active state for a second operating period, the second operating period is scheduled in advance.

21. The communication apparatus of claim 16, further comprising:
   an interface unit configured to exchange information sets with an external device.

* * * * *